US005671412A

United States Patent [19]

Christiano

[11] Patent Number: 5,671,412
[45] Date of Patent: Sep. 23, 1997

[54] LICENSE MANAGEMENT SYSTEM FOR SOFTWARE APPLICATIONS

[75] Inventor: Matt Christiano, Saratoga, Calif.

[73] Assignee: Globetrotter Software, Incorporated, Campbell, Calif.

[21] Appl. No.: 508,829

[22] Filed: Jul. 28, 1995

[51] Int. Cl.[6] ........ G06F 17/30

[52] U.S. Cl. ........ 395/615

[58] Field of Search ........ 395/615, 186

[56] References Cited

U.S. PATENT DOCUMENTS

| | | | |
|---|---|---|---|
| 4,791,565 | 12/1988 | Dunham et al. | 395/186 |
| 4,924,378 | 5/1990 | Hersey et al. | 395/187 |
| 5,014,234 | 5/1991 | Edwards, Jr. | 395/186 |
| 5,438,508 | 8/1995 | Wyman | 395/208 |
| 5,553,143 | 9/1996 | Ross et al. | 380/25 |

*Primary Examiner*—Wayne Amsbury
*Attorney, Agent, or Firm*—Hickman Beyer & Weaver, LLP

[57] ABSTRACT

An improved software license management system in accordance with the present invention is disclosed. A license server initializes a license database by receiving a package license description that includes component license descriptions for component software products in a package. Licenses for software products are also received, and license records are created in the license database for components and suite packages, where each record includes a number of licenses available to be checked out. A client computer system can request a license for a component product in a package. A license is granted to the client when the client is allowed to receive the license according to a license policy. When a component license is checked out, a linked suite license is also automatically checked out. No other client thus may use a component license linked with the suite license record unless another suite license is checked out. The license management system also provides a number of modifiers to be included in license records, including an overdraft quantity, a fail safe indicator, a minimum license quantity, and a capacity indicator. A finder and a diagnostic process can be implemented at the client computer system to find the license server over a network and provide a tool to diagnose failures in the license management system.

70 Claims, 15 Drawing Sheets

LICENSE MANAGEMENT SYSTEM FOR SOFTWARE APPLICATIONS

BACKGROUND OF THE INVENTION

The present invention relates generally to a license management system suitable for licensing and managing the usage of software products.

Software piracy has long been a problem that has plagued software developers. The unauthorized copying of software products by users often causes significant losses of sales for software developers. Accordingly, a variety of protection schemes have been developed to protect software from unauthorized copying and which also allow a legitimate user to operate the software.

A popular approach to protect software is to provide licenses to end users rather than selling the software directly to those users. A user is licensed by the software vendor to use the software under certain conditions that prevent unlimited use and/or copying of the software. Software vendors use different methods or "license policies" to license software. Commonly used license policies include "node-locked" licenses, "floating" or "concurrent usage" licenses, "site" licenses, and "metered" licenses, each of which utilizes a different way of determining when or where a user can use a software program. The "node-locked" license allows a program to be used only on a specific computer node in a network (or by a specific user). One method of assigning a unique identifier to a computer system is to use hardware means, such as a hardware key or other methods that are well known. The "floating" or "concurrent usage" license allows only a predetermined number of copies of the software to run simultaneously on the network, regardless of the node on which the software is running. The "site" license allows the licensed software to be used anywhere within a licensed company or other defined area or organization. Finally, the "metered" license allows a predetermined number of activations or uses of the program, or a predetermined amount of time which the program can be run on a central processing unit (CPU) of a computer.

Software vendors can provide other features to a software license policy. For example, the level of enforcement of the license can vary in different licenses. A software vendor can provide a high level of enforcement, which might never allow the program to be used if the license is violated. A low level of enforcement can also be provided by the software vendor, so that, for example, a program can still be used when the license is violated and a warning is issued to the user.

Many software vendors use a license management system to enforce a software policy. Such a system typically includes a computer network and a license server or "license manager" that is often provided at a server node or similar host location on the network which all computer nodes on the network can access. The license manager can receive requests from computer nodes for specific licenses and send out answers to those requests to the specific nodes. The license manager can keep track of all the various programs licenses that have been "checked out" by client computer systems and can determine when a request would violate a license. For example, the license manager can check the node identification of a client computer that requests a license for a node-locked program. Or, the license manager can keep track of how many programs or licenses are being used at once under a concurrent use license, or how long a program has been used under a metered license.

One problem that has been seen in conventional license management systems concerns the licensing of "packages" or "suites". A package includes several component programs and license information for each component program. Suites are a type of package in which a combination of two or more software programs that were originally sold separately but have since been combined and sold as a single package for marketing purposes. For example, Microsoft Office® sold by Microsoft Corporation includes three component programs that were originally sold separately: Microsoft Word®, Microsoft Excel®, and Microsoft Power Point®. Using current license managers, no package license for the combined products is available to allow the suite to operate under the license manager. Also, current license managers do not have the capability to allow the degree of interaction of licenses necessary to implement such a package license. For example, the use of one component program of the suite should tie up the use of the other component programs in the suite for a single license available for the package. Thus, with a single package license, one user could not operate one program in the package while another user operated another program in the same package. Prior art license managers are not capable of delegating program usage for this type of program organization.

Another problem that has been encountered with existing license management systems is the ability of a client computer node to locate a license server to retrieve a license for a designated program. The problems of finding a server on a network are made more difficult in a license managed network, since license management servers cannot be freely moved due to the nature and security of licenses. For the same reason, it is not desirable that license servers be duplicated on a network to assist in locating a server. The variety of existing methods for locating a license server each have their own problems. Some systems use a license file which contains the network address location of the license server. However, this license file system requires increased administration overhead at large sites when new nodes are added to the network. Other systems use a predetermined server location; however, this type of system can cause problems when two software vendors choose the same network address for the license server, resulting in a conflict, or when the license server node is changed. Still other systems utilize a network broadcast to locate a license server. However, in large networks, such broadcasts are generally unacceptable due to a number of problems created by the broadcasts, such as excessive network traffic. Finally, still other systems utilize a general purpose location broker. However, such location brokers typically utilize network broadcasts, which are unacceptable in large networks, as well as requiring large administrative overhead.

Still another problem in prior license management systems involves a lack of flexibility in distributing licenses to requesters. In many situations, a requester may not have access to a program due to a strict license policy but may have special need for such access due to emergencies or other needs. Or, a failure in the license management system may prevent a requester from using a program in prior systems, even when the requester has a special or emergency need for use of a program. Also, the platform of the client computer system may play a role in determining the amount of required licenses for a program used on that platform. Since some platforms can process data much quicker than other platforms, the faster platforms can be required to consume more licenses than a slower platform. The ability to distribute licenses when taking into account these factors does not exist in prior license management systems.

Yet another problem found in existing license management systems is that there is no ability to diagnose problems in the system. Since a license management system is frequently used as a type of security system for the licensed software, many aspects of the operation of the system are poorly documented to prevent unauthorized use of licenses. However, a side effect of this poor documentation is that failures in the system are difficult to diagnose. If even a simple, minor function of the license management system fails, a network administrator has few tools to try to remedy the failures.

SUMMARY OF THE INVENTION

An improved software license management system in accordance with the present invention is disclosed. A license server of the present invention provides package and program licenses and allows several license modifiers to be stored in license records to provide a licensor with a variety of options and flexibility. A server address finder and diagnostic function mitigate common license server network problems.

The license management system includes a license server that initializes a license database by first receiving one or more package license descriptions, each describing a package license associated with a software product including component license descriptions describing licenses for component products in the package. License items are then received for software products, where a license item can be a package license item or a standard license item. If the license item is a standard license item, a standard license record is entered in the license database. If the license item is a package license item that matches one of the package license descriptions, a component license record is created in the license database for each component license description in the matched package license description.

Each of the license records includes a number of licenses available for the software product associated with the license record. The licenses are able to be checked out by a client requesting a license for the associated software product. Additionally, the package description can include a suite indicator for indicating when a package is a suite. When a package is a suite, a suite license record for the suite license description is also created in the license database. The component license record preferably includes a link to the suite license record. Preferably, the component license record and the suite license record include a number of license units indicating a number of times that a license may be checked out from the license database by a client. When a license provided by the component license record is checked out, a license provided by the suite license record linked to said component license record is also automatically checked out. Thus, when a suite license is checked out by a client, no other client may use a component license linked with the suite license record unless another suite license is checked out.

Each component license description preferably includes a name and a version number of the associated software product, where the software product is a software program. Alternatively, the component software product can be a package, so that packages can be components of higher level packages. The component license description also includes a license multiplier for determining how many component licenses may be checked out by a client.

The license records stored on the license database can each store a number of modifiers. An overdraft quantity indicates a number of licenses that can be provided to clients over the authorized amount of licenses stored in the license records. A fail safe indicator indicates that licenses can be provided over the amount of licenses stored in the license record to clients when a failure occurs in the license management system. A minimum quantity indicates a minimum amount of licenses required to be checked out to allow the designated program to be used by the client. A capacity indicator indicates that the license record provides a required number of licenses to a requesting client dependent on an environmental resource capacity of the requesting client computer system. The environmental resource capacity can be determined by processing speed of the client platform or other client environment characteristics.

The license server provides licenses from the license database to client computer systems to allow the client computer systems to use licensed software products. A request is received from a client by the server. The request can be for a component license for a component product in a package. A package (suite) license is granted to the client when the client is allowed to receive the package license according to a license policy. The package license allows the client to use the requested component product. The component license and package license are denied to the client when the client is not allowed to receive the component license or the package license according to the license policy. The component license is not denied when the component license and the package license are fail safe licenses. When a package license is granted, different clients are prevented from receiving a license for a component product included in the package. Preferably, when the package license is granted to a client, the client is added to a user list for the requested product. To determine if a client is granted a license for the package, the server checks if the number of licenses requested plus licenses in use by clients in the user list is less than or equal to the available number of licenses for the requested product.

A client computer system requesting a license for a designated software product locates a license server on a license management network. This can be accomplished by sending a request to a finder located on the network to provide a license address for the license server. A license request is then sent by the client to the located license server. The request preferably includes the environmental resource capacity of the computer system that determines how many licenses are required by the computer system to use the designated product. A status message is received from the license server that provides information about whether the requested license has been granted or denied. A license policy associated with the designated product may be enforced based on the information in the status message. The license policy may not allow the designated program to be used when the requested license has not been granted, or the license policy may provide a warning on the computer system and allow the designated product to be used. The program instructions for locating, sending and receiving can also be implemented as part of a diagnostic process on the computer system. The diagnostic process preferably can check addresses on the network to find the license server when the license server cannot normally be located.

The finder is used for locating the license server on the network implementing a license management system. The finder receives a request from a client computer system for a license address of the license server. A license address for the license server is looked up in a table, where the license address is determined by client information in the request. Finally, the license address of the license server is provided to the client computer system. The client information can include parameters such as a name of a user on said client computer system, a host name of the client computer system, a terminal name of said client computer system, and/or vendor name of the client software.

The present invention advantageously provides an improved software license management system including a license server that provides program licenses and package licenses, allowing program licenses to be collected and organized by a licensor in a variety of ways. In addition, suite licenses prevent more than a single user from using any component of the suite. The license modifiers, including overdraft, minimum, fail safe, and capacity, allow the licensor to provide a variety of options and flexibility to clients. The server address finder and diagnostic function of the present invention allow common license server network problems to be efficiently circumvented or alleviated.

These and other advantages of the present invention will become apparent to those skilled in the art after reading the following descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE INVENTION

Figure 1:
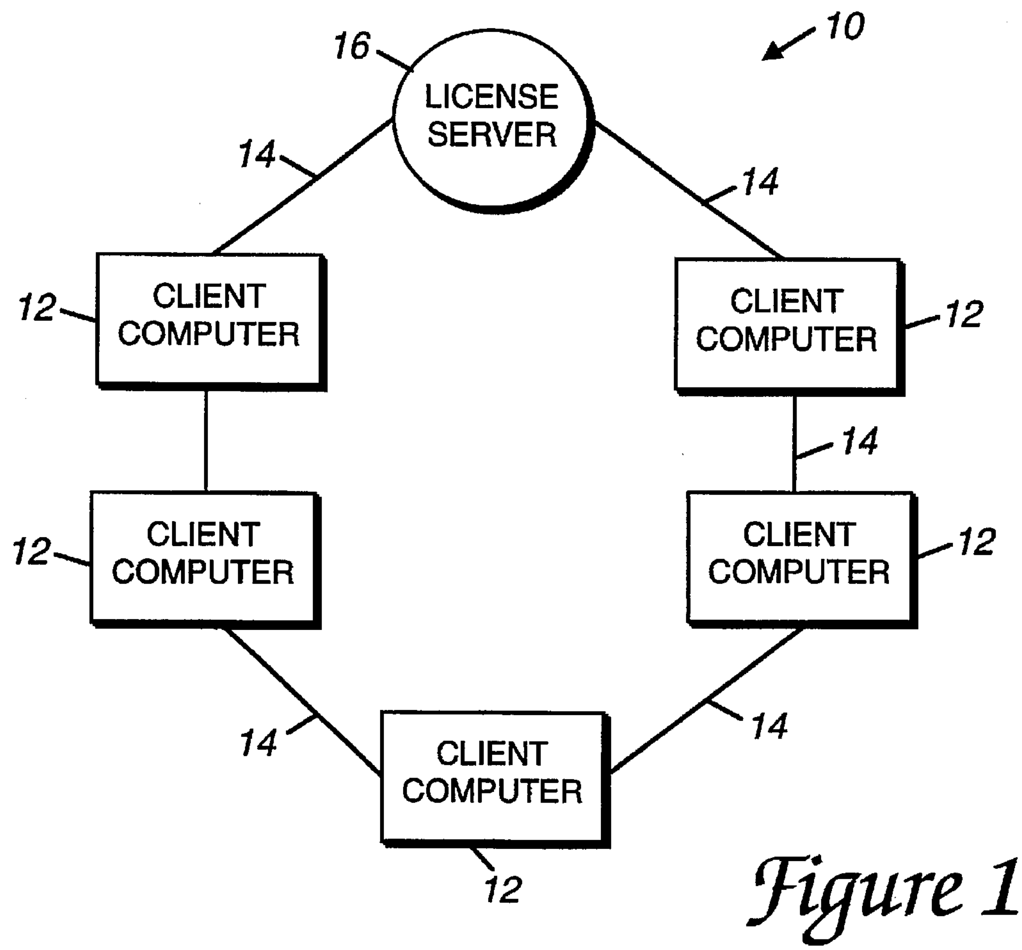
FIG. 1 is a schematic diagram of a license management system incorporating a license server and client computer systems.

The present invention relates to software license management systems. Referring initially to FIG. 1, a license management system 10 suitable for incorporating the present invention will be described. As seen therein, individual client computer systems 12 are interconnected by network connections 14. Each computer system 12 serves as a node in the network having its own network address so that other computer systems 12 can send and receive data from any other computer system 12 in the network system 10. As is well known to those skilled in the art, a client computer system 12 typically includes a microprocessor and several components coupled to the microprocessor, such as memory (RAM, ROM), input components such as a keyboard, input tablet, etc., and output components such as a screen display, printer, etc.

Also included in the network system 10 of the present invention is a license server 16, which is connected in network system 10 like computer systems 12. License server 16 may typically include hardware components for implementing license management processes, such as a microprocessor(s) or central processing unit (CPU) and associated components coupled to the microprocessor by a main bus, such as random access memory (RAM), read-only memory (ROM), input/output components, storage devices, etc., as is well known to those skilled in the art. License server either includes or has access to a database implemented on in a storage medium such as memory, disk space, or the like.

The license server 16 serves as a "license manager" for the computer systems 12 and for other servers (not shown) that may be included in system 10. License server 16 stores licenses for software programs available to computer systems 12 and assigns or "checks out" these licenses to client computer systems 12 that request a license. Herein, the term "license" is used to designate permission or authorization for a client computer system to use or "implement" (run) a single designated software product, such as a program, or to view data incorporated in the software product. The vendor, supplier, or manager ("licensor") of the software typically provides the licenses for users on the network. For example, if a user wishes to operate a designated computer program on a particular computer system 12 (i.e., run or execute the program on the central processing unit (CPU) of that computer system), then the program (or a license program) instructs the computer system to send out a license request over license management system 10 to the license server 16. The license server 16 receives the license request and determines if the requesting client computer system is allowed check out or be assigned a license for that program, i.e., allowed to run or use the program. Preferably, a license is checked out to a client computer system only if the requesting computer system is allowed to have the requested license according to a predetermined software license policy. To use multiple copies of the designated program, a client would typically have to check out an equivalent number of licenses.

Many types of software license policies can be implemented. For example, a "node-locked" policy allows only one computer system at a specific node on the license management system 10 to use a designated software product. Thus, under a node-locked policy, a computer system 12 would be able to check out a license only if a license were available on the license server which matched that computer system's node, address, serial number, user name, or other identifier. In a "floating" or "concurrent usage" type of license policy, a predetermined number of copies of a program are allowed to be run simultaneously on license management system 10. A computer system 12 is thus able to check out a concurrent usage license for a program only if the maximum allowed number of copies of that program are currently not in use by other computer systems, i.e., if one of a limited number of licenses for that program is available to be checked out. The license server keeps track of how many licenses are currently checked out and thus can quickly determine if the maximum number of licenses for a program are in use. In a "site" license policy, a computer system 12 can check out a license for a program if the computer system is located in a predetermined location, such as on license management system 10, within a company or other defined organization, etc. License server 16 can determine where a requesting client computer system is located by examining other information included in the license request, such as the node address or specific location data. In a "metered" license policy, a predetermined number of activations of a program or a predetermined amount of time during which the software can be used on a computer are allowed. When a client computer system 12 requests a license in such a policy, the license server can refer to a record of how many times that program has been activated, or how much run time of the program has been used, and can grant the license if appropriate. The license server can also keep track of the elapsed time while the computer system is implementing the program to determine if the allowed time runs out.

The present invention makes use of the concurrent usage license policy, as described above, among other policies. In concurrent use policy, a number of available program licenses are made available for each program that is licensed. These licenses can be specified in "license units", as described below. Thus, once a single program license is "checked out" by one computer system, another computer system cannot use that license and must check out (be assigned) another license for that program, if any are still available. This concurrent use policy can also be used in conjunction with other license policies, such as the metered policy and/or the node-locked policy. For example, a number of licenses can be made available from the license server 16, and the license server can also keep track of the node identification of a client or how many minutes (or activations) remain for the use of each license.

When a license is violated by a client computer system, the license server preferably returns a status message to the requesting computer system that indicates that the computer system would be violating the license policy when using the designated program. The client computer system or program then decides the action to take if a violation has occurred. In some embodiments, the server can decide this action. The action taken depends on the level of enforcement desired by the provider of the license policy. Different degrees of enforcement to the use of the computer program on the client computer system can be provided depending on the needs of the policy provider. For example, if a lenient enforcement technique is implemented, and if license request for a designated program is denied, then the violating computer system can display a simple warning to the user while still allowing the designated program to be run on the computer system. If a strict enforcement technique is provided, and a license request is denied, the computer system 12 may immediately cause the designated program to quit on the computer system and not allow the program to be activated and used as long as the license policy is violated. Alternatively, the license server can decide the action to take if a license violation has occurred and can transmit the decided action to the client computer system, which can implement the action.

Figure 2A:
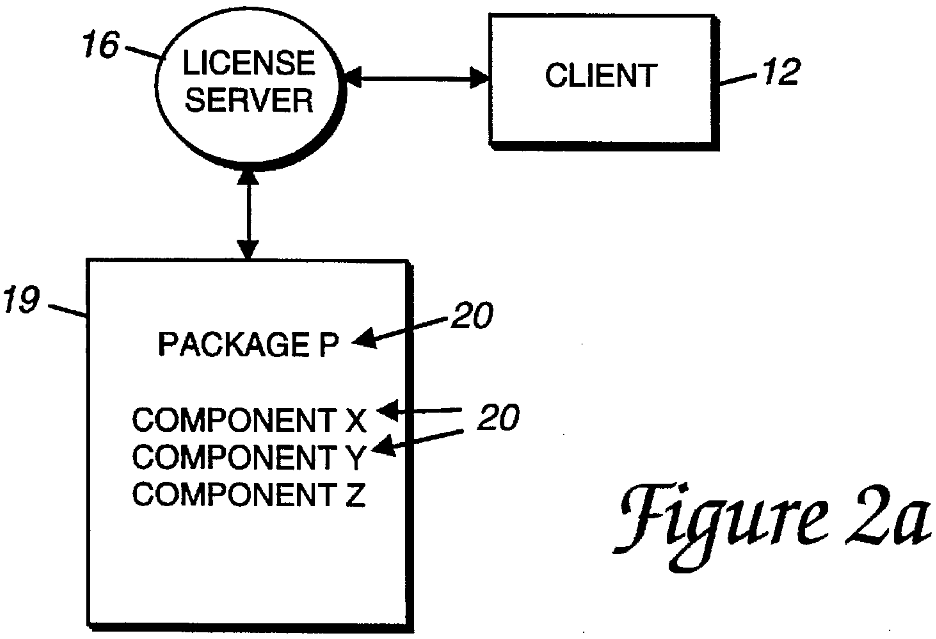
FIG. 2*a* is a schematic diagram of the license server, a client computer system, and an internal license database.

FIG. 2*a* is a block diagram illustrating a client computer system 12 and license server 16 having received a package "certificate" and providing an internal license database 19 of the present invention. A "package", as referenced herein, designates a generic grouping of different component products included within that package. The component products are typically programs, although in an alternate embodiment, packages can be components of higher level packages. The term "software product" thus is considered to be a program, package, or other similar type of licensed software product. "Program" refers to any software process, such as an application program (word processor, spreadsheet, drawing program, etc.), utility program, resident or background program, etc. For example, a package can include different component programs that are conveniently specified within a package heading. In addition, some packages may be specified as "suites", which are packages that provide licenses of the components of the suite to only one user for each suite license. Thus, if a non-suite package P had components X, Y, and Z, one user could use component X, and a different user could use component Y without checking out a new package license. If the package P were a suite, however, then only one user could use components X, Y and Z. A different user would have to check out a new license for package P to be able to use any of the components.

Internal database 19 can be implemented on a standard storage device or memory device coupled to the license server 16, as is well-known to those skilled in the art, and can be organized as a license file. For example, a hard drive can store license data. Preferably, as described below, the license server creates the internal license database 19 after receiving standard licenses and/or package certificates from an external file or other input source, where each package certificate includes a package description and package license data. Alternatively, the package description of the certificate can first be read, and the package license data can be retrieved using a pointer in the package description. Or, the internal representation of the package license data can be stored in an external file instead of database 19 to encode the data. As used herein, the term "license database" refers to the internal license database 19.

The internal license database 19 stores entries for each license received from the external file. If a package certificate is received from the external file, the license server examines the package description and determines how many license records are written into the internal license database in an initialization procedure (described below), where each license stored on the internal license database is stored as a license record. The license server examines these license records to determine whether a requesting computer system should receive a license for a designated software product, as described subsequently.

Figure 2B:
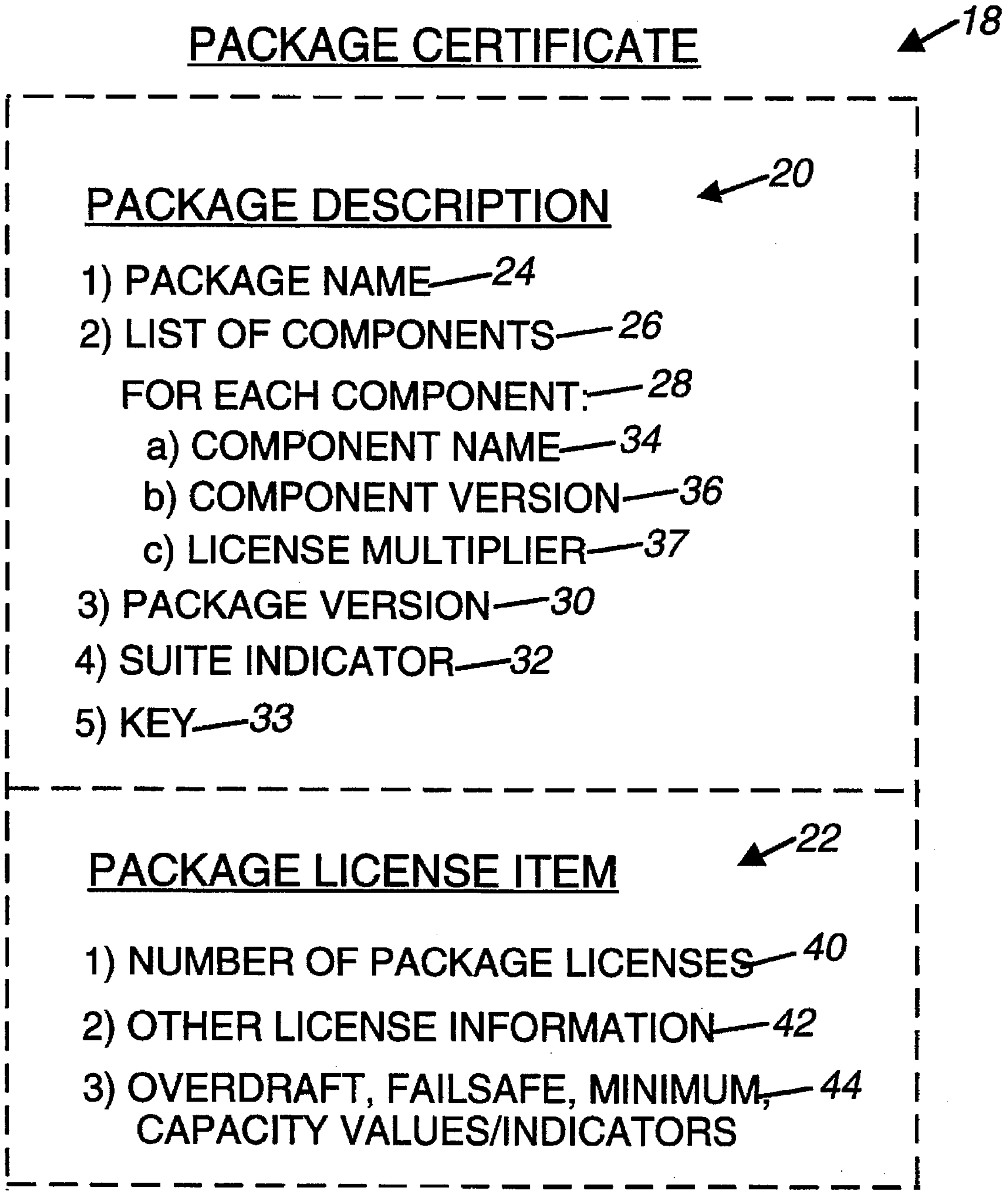
FIG. 2*b* is a diagrammatic illustration of a license certificate received by the license server.

FIG. 2*b* is a diagrammatic illustration of a package certificate 18. A package certificate includes a package license description 20 and package license item 22. Package license description 20 includes five main fields in the described embodiment, including package name field 24, list of components field 26, component descriptor fields 28, package version field 30, and suite indicator field 32. Additional fields can be included in other embodiments. It should be noted that a standard, non-package license would include only a license item similar to license item 22 and not a description 20.

Package name field 24 stores the package name, which is the identifier of the package. This name can be searched by license server 16 to match a package license to a request for a package license. List of components field 26 includes all the component software products that are included within the package product named in field 24. As described above, a package includes at least one component product, and typically includes multiple component products that are organized in the package. Each component listed in field 26 has a name or identifier field 34, similar to package field 24, which stores a name that can be matched with a request from a client computer system for a particular component license. Each component also includes a version field 36 which stores the version of that component program. Due to software companies continually updating the versions of component programs, and due to new licenses for new versions of the programs being sold by software vendors, the version number can be significant in determining if the request for a component program matches a component included in the package. Also included for each component is a number of licenses field 37 which provides a license multiplier for each component. This multiplier is multiplied by the number of authorized package licenses stored in the license data portion 22 of the certificate to determine the number of authorized component licenses available, as described in greater detail subsequently. The component license information stored in the package description 20 can be considered "component license descriptions."

Package version field 30 stores the version of the package, similar to the component version field 36. Suite indicator field 32 stores a flag indicating if the current package is a suite or a non-suite package. A suite, as described above, is a package whose components may only be used by the user who checked out the suite license or any of the component licenses of the suite. Key field 33 stores a key that is used to verify the package description, as described subsequently. The fields of package description 20 can be arranged in a wide variety of ways, and may include additional fields in other embodiments.

Package license item 22 includes three portions in the described embodiment, including the number of package licenses portion 40, which stores the number of available package licenses (or "license units", as described subsequently) for that package (assuming a concurrent usage license policy). Other information portion 42 stores other licensing information that may be pertinent to the package license, such as a date of expiration of the license record, a key for verifying that the license item 22 has not been tampered with, and other desired information as is well known to those skilled in the art. Options portion 44 stores optional "license modifier" information pertinent to licensing features of the present invention, including an overdraft quantity, a failsafe indicator, a minimum quantity, and a capacity indicator. These modifiers of the present invention are described subsequently with respect to FIG. 7. In the described embodiment, each component license of a package license has the same modifier information, i.e., the same overdraft quantity, failsafe indicator, etc. Alternatively, each component license (and suite license, if applicable) can be specified to have its own individual license modifier information. For example, a component's name and version can be specified in package description 20 along with any license modifiers that apply only to the license for that component.

Figure 3:
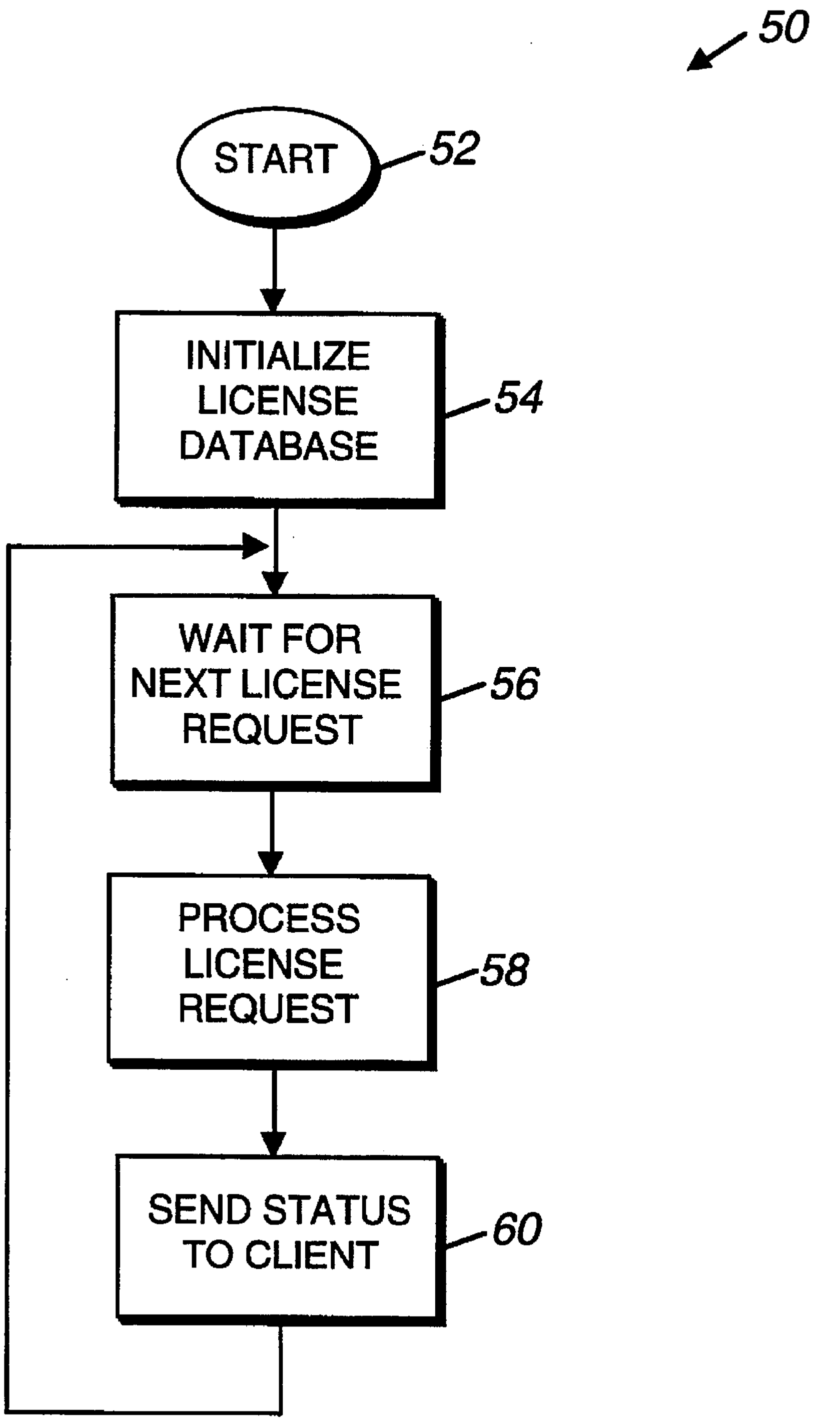
FIG. 3 is a flow diagram illustrating a method of implementing the license server of FIG. 2.

FIG. 3 is a flow diagram illustrating a process of implementing the license server 16 of the present invention as shown in FIG. 1. This process, for example, can be implemented with license server software on a microprocessor or CPU of license server 16. Standard associated components can be coupled to the microprocessor, such as random access memory (RAM), read-only memory (ROM), input/output components, storage devices, etc., as is well known to those skilled in the art.

The process begins at 52, and, in step 54, a license database is initialized. In this step, package descriptions 20 and license items 22 are read from a external file, external database, or other storage medium which stores license data and package license descriptions for the license server. The software licensor can conveniently provide standard and package licenses on this external file. The read license descriptions and licenses are added to license database 19 for the license server. The internal license database 19 is also referred to herein as a "license file" on which the processed database data is organized. The license file may be accessible to client computer systems in some embodiments. Step 54 is described in greater detail below with respect to FIG. 4. In addition, other steps well-known to those skilled in the art would be performed before and after step 54 to implement the license server, such as initializing network software and processes, bookkeeping steps such as allocating internal variables, etc.

In next step 56, the license server waits for the next license request from a client computer system 12 as shown in FIG. 1. Typically, a license request is a message sent by a client 12 which includes identifying information about a designated product for which a license is being requested, such as an identification of the product and the version number of the product. Herein, the "designated product" or "requested product" is a program, package, or other licensed product for which a license is being requested. Other information can also be included in the license request, such as an identification of the computer system 12 which is sending the request (as in a node-locked policy). The time or number of activations which have already been used on the designated program (in a metered policy) and the physical or organizational location of the client computer system (in a site license policy) can also be provide in the license request. In the described embodiment, a concurrent usage license policy is implemented that provides a predetermined number of licenses for computer systems on the network, so that the minimum information in the license request is the identification or name of the designated product for which a license is requested. The request is described in greater detail with respect to the client requesting process of FIG. 10 and FIG. 11. In addition, the license request can be decrypted if it was encrypted when output by the client. Such encrypted and decrypted requests, and other security measures to prevent the user from fraudulently obtaining licenses, are well known to those skilled in the art.

Once a license request is received in step 56, then step 58 is initiated, in which the license request is processed. This includes checking the status of the licenses, the requester, and the license policy and determining if a license should be provided to the requester. This step is described in greater detail with respect to FIG. 8. In next step 60, the license server 16 outputs the resulting status as a status message to the client computer system. The status message includes information about whether the license is granted or denied. If the license is granted, then the status message indicates to the designated product that it may be used on the computer system, as is well known to those skilled in the art. If the license is denied, the status message can include information depending on the desired enforcement in the licensing system. For example, if a high level of enforcement is desired, the status message includes a license denied signal that does not allow the designated product to be used on the requesting computer system. If a low level of enforcement is desired, the status message can cause a warning that indicates that the license has been violated, but still allows the designated product to be used by the requesting computer system. The denied signal can also include other information concerning other features of the present invention, such as a fail safe status, as described subsequently. The process then returns to step 56 to wait for another license request.

Figure 4:
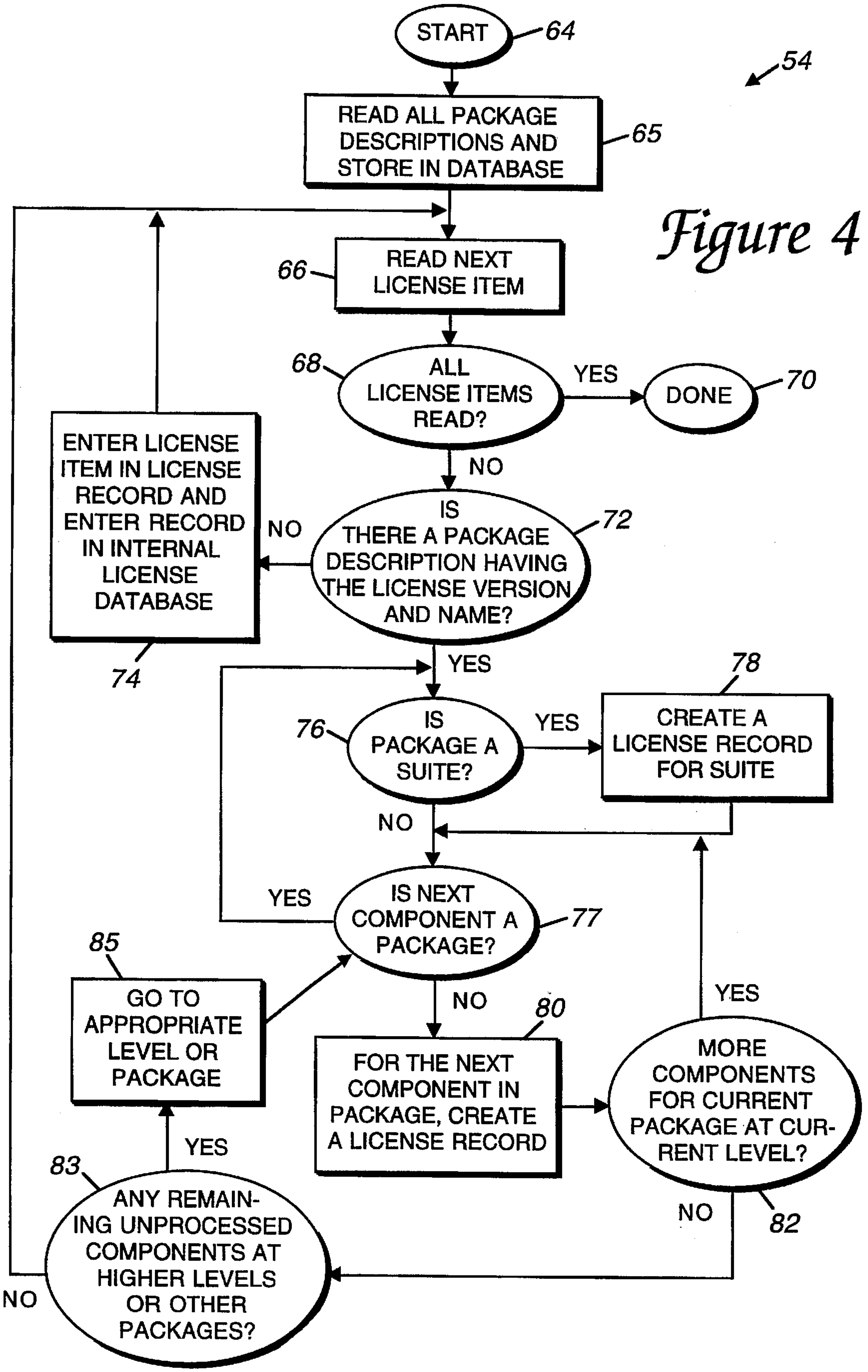
FIG. 4 is a flow diagram illustrating a method of initializing the license database (step 54 of FIG. 3)

FIG. 4 is a flow diagram illustrating the step 54 of initializing the license database as shown in FIG. 3. The process beings at 64, and, in step 65, all the package descriptions are read from an external file, external database, or a list of license descriptions and data otherwise input to the license server (referred to as the "external file" herein). Each item in the external file is read and examined to determine if it is a package description 20. This can be determined, for example, by checking if the item starts with the term "package." In addition, each package description can be verified by the server as authentic and unmodified as a security measure to prevent unauthorized access to the component licenses. Preferably, the key stored in field 33 of each package description can be examined by methods well known to those skilled in the art to verify the package description, and package descriptions that do not have a correct key are ignored. Each found and verified package description is then stored in the internal database 19 or other internal memory space in license server 16. A package license description 20 is detailed with respect to FIG. 2*b*, and includes information on identifiers for the package and the component licenses included in the package. An example of a package license description is shown in Table 1, below.

PACKAGE P 1.00 KEY COMPONENTS="X:2:3.0 Y Z A::1.5 B:7"

OPTIONS=SUITE

TABLE 1

This item is designated as a package license description by the first string. The second string "P" designates the name of the package, and the third string "1.00" designates the version number of the package. The "KEY" provides an authentication, such as an X-digit number or string of characters, which allows the server process to verify that the package description has not been tampered with. The server can verify the key using a known algorithm, for example. Other license verification information can be stored in the license description as well. The component descriptions included in the package license description are specified after the string "COMPONENTS", where each component description is separated by a space. The "OPTIONS" string specifies any options for the package license. These and other portions of the package license description are described in greater detail below.

In step 66, the next license item is read from the external file. The retrieved license item can be a standard license item, designating a number of licenses (license units) for a single program, as is well-known to those skilled in the art, and may also include other information such as the license modifiers of the present invention. The license item can also be a package license item 22 that includes a number of licenses that are applied to each component specified in an associated package description 20. The license items (and license records) in the described embodiment are designated by the term "FEATURE", as shown below. In addition, each license data item retrieved in step 66 is preferably verified and authenticated by the license server using the key stored in the license data item. This verification is similar to that described above in step 65, with the exception that license items are typically only usable on a single license server, as is well known to those skilled in the art, and thus the key may include specific server information. Package descriptions are not necessarily specific to any license server, so that the key may be more generic.

In step 68, it is determined whether all license items have been read, i.e., if there are no more license items to potentially add to the license database of the license server. If all license items have been examined, then the initialization process is complete at step 70. If not all license items have been examined, then the process continues to step 72, where it is determined if there is a package description having the license item's version and name, i.e., whether the license item matches a package description 20 that was read and stored in step 65. This is preferably determined by comparing the license item's name and version to the name and version of each package description 20. If there is not a matching package description, then the current license item describes a standard license. A standard license item typically is associated with a single program or product, as is well known to those skilled in the art. Step 74 is then implemented, in which the license item is entered into a license record. The license record is then entered into the internal license database. The process involved in step 74 for the present invention is described in greater detail with reference to FIG. 7. The process of FIG. 4 then returns to step 66 to read the next license item from the external file.

If, in step 72, the license item matches a package description and is therefore a package license item 22, then the process continues to step 76, where it is determined whether the associated package is a suite. As explained above, a suite is a type of package that limits the use of every component in the package to one user or computer system. In the example license description of Table 1, a suite is designated by the OPTIONS string at the end of the package description 20. If the package is a suite, then, in step 78, a separate license record is created for the suite and entered into the internal license database. This separate suite license record is used to keep track of the number of suite licenses in use at any particular time, as described below. Step 78 is described in greater detail below with respect to FIG. 6. A license record is not created for a non-suite package, since such a package does not regulate the licenses of its components.

After step 78, or if the package is not a suite in step 76, the process continues to step 77, in which the next component in the package is checked to determine if it is a package. In an alternate embodiment of the present invention, packages can be specified as components of higher level packages. The child package would be at a lower hierarchical "level" than the parent package in the complete package structure. Thus, if the next component in the package is also a package (by checking the list of packages found in step 65), the process returns back to step 76 to check if the package is a suite. If the next component is not a package, i.e., the component is a regular license, then the process continues to step 80, where a license record is created in the license database for the next component program described in the package license description 20. If this is the first time implementing step 80, then a license record is created for the first component program in the package description 20 and entered in the license database. The component license records are created from information in the package license description, such as in Table 1. Step 80 is described in greater detail below with respect to FIG. 5.

In step 82, the process checks if there are more components in the currently examined package at the current hierarchical level of packages. If so, the process returns to step 77 to check if the next component in the package is a package, as described above. If there are no more components, the process continues to step 83, where it is determined if there are any remaining unprocessed components at higher levels or in other packages in the hierarchy. If so, the process goes to the appropriate hierarchical level or package in step 85. The appropriate level can be determined by a recursive method to process each branch of the hierarchy before processing another branch, or by other methods as are well known to those skilled in the art. The process then returns to step 77 to check if the next component of the current package is a package. If no unprocessed components remain in the package structure in step 83, then the process returns to step 66 to read the next license item from the external file. If packages are not being implemented as components of other packages, then steps 77, 83, and 85 can be omitted from the above process.

The process of FIG. 4 allows a software licensor to specify and store a number of component licenses using only one package description 20 and package license item 22 in the external file. The component license details are determined from one set of package license data. This provides a convenient method to organize licenses for related programs and to specify many component licenses in a format that saves storage space and transmission and data entry time.

Figure 5:
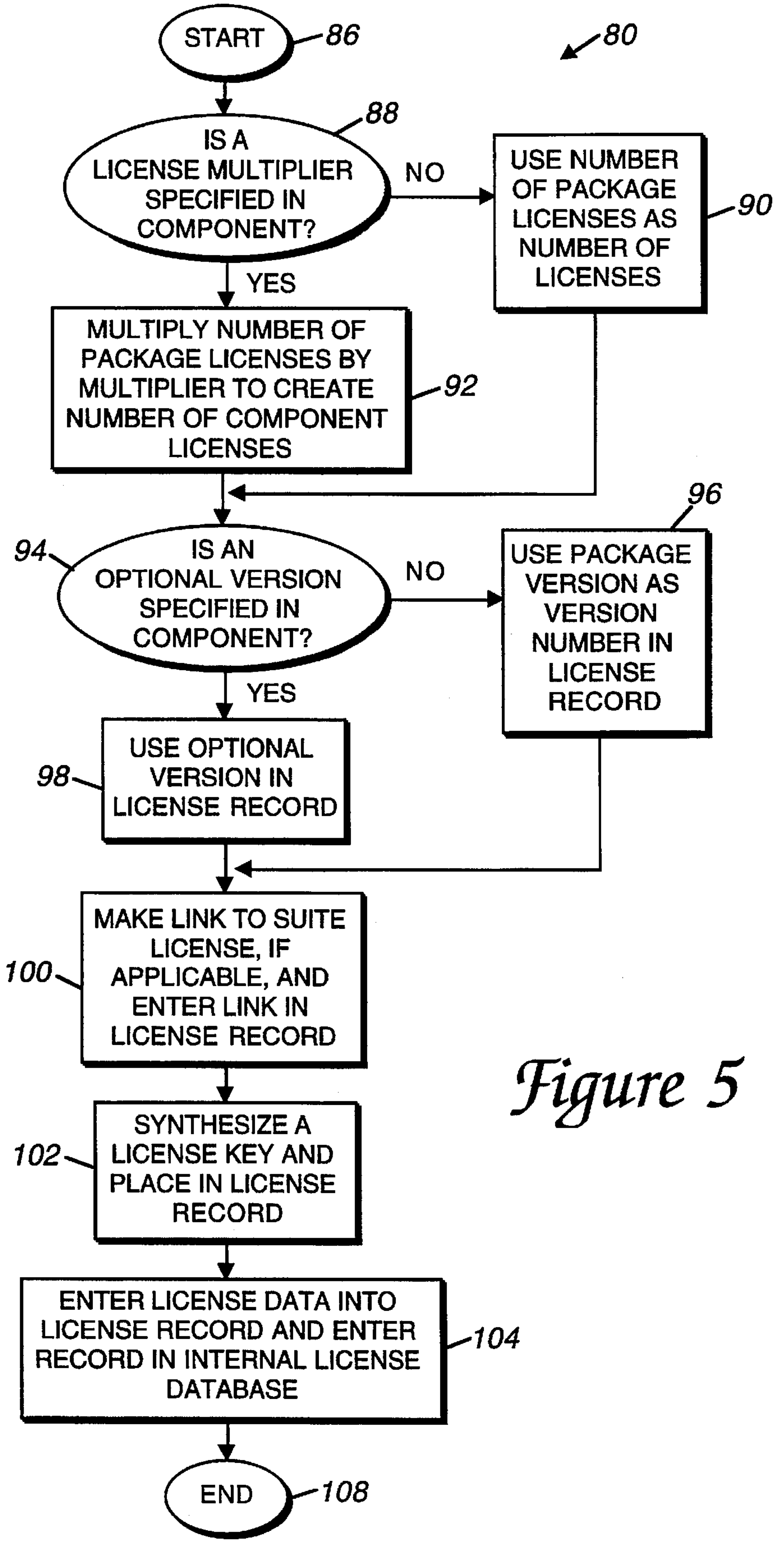
FIG. 5 is a flow diagram illustrating a method of creating and entering a license record in the license database for a component in a package (step 80 of FIG. 4)

FIG. 5 is a flow diagram illustrating step 80 of FIG. 4, in which a license record is created and entered in the license database for the next component program in the examined package. The process begins at 86. In step 88, the process determines whether a license multiplier is specified for the currently-examined component. A license multiplier, as referred to herein, is a quantity that is stored in package license description 20 which allows the licensor to designate a specific amount of component licenses for each component description in the package description. If a license multiplier is specified, then, in step 92, the number of package licenses is multiplied by the license multiplier to create the number of available component licenses, and that number is entered in a created license record. The number of package licenses is known from the package license item 22. This number can also be referred to as "license units" (explained below). For example, in Table 1, the number after the first colon in a component description is the component multiplier; if no value is specified, then the value is assumed to be 1. Package P thus includes Component X with a license multiplier of 2, so that in each license for Package P, there are two licenses for Component X automatically specified. If there is no license multiplier specified in the component description, then step 90 is implemented, in which a number of component licenses is entered in the license record equal to the number of package licenses, i.e., a multiplier of 1 is assumed.

After step 92 or step 90, step 94 is implemented, in which the process checks whether an optional version is specified in the currently-examined component. The version of a component, if specified, is preferably listed after a second colon in the package description. Thus, for Package P of Table 1, Component X has a multiplier of 2 (after the first colon) and a version of 3.0 (after the second colon). Components Y and Z do not specify a multiplier or a version. Component A only specifies a version of 1.5 (a multiplier of 1 is assumed after the first colon), and Component B only specifies a multiplier of 7. If a version is specified, then in step 98 that version is entered in the license record. If a version is not specified, then in step 96 the package version found in the package description 20 is used as the component version number in the license record. After step 96 or 98, step 100 is initiated, wherein a link is made to the suite license record that includes the current component, if appropriate. That is, if a package is a suite, a suite license record is made in step 78 if FIG. 4 (described in FIG. 6), and a link to that suite license record is made and stored in the license record if the current component is part of a suite. This link need only be, for example, the identifier and version number of the appropriate suite. Thus, if a license for a component is checked out, and that component is part of a suite, then the suite can be found via the link and a suite license can be correspondingly checked out, as described with reference to FIG. 8.

In next step 102, a license record key is synthesized by a CPU or equivalent processor and the key sequence is entered in the component license record. Thus, a unique key is synthesized for each component in a package when each component license is added to the internal database. Many methods of synthesizing such keys are well-known to those skilled in the art; for example, the version number, names, or other information in a component can be used to synthesize a 10- or 12-character key code using a standard or non-standard encryption algorithm. Other methods can also be used to synthesize a key. The server can verify the key to gain access to the license record when a license request is received (explained below) and is used to prevent unauthorized access to a license record. In step 104, other license data from the external file is entered into the license record and the license record is entered into the internal license database 19. This step is similar to step 80 of FIG. 4, and is described in greater detail with respect to FIG. 7. The process is then complete as indicated at 108.

An example of component license records that are created from the package description shown in Table 1 is shown below in Table 2:

FEATURE X 3.00 1-JAN-99 10 KEY LINK P 1.00 OVERDRAFT=3,
MINIMUM=2, OPTIONS="FAILSAFE, CAPACITY"
FEATURE Y 1.00 1-JAN-99 5 KEY LINK P 1.00 OVERDRAFT=3,
MINIMUM=2, OPTIONS="FAILSAFE, CAPACITY"
FEATURE Z 1.00 1-JAN-99 5 KEY LINK P 1.00 OVERDRAFT=3,
MINIMUM=2, OPTIONS="FAILSAFE, CAPACITY"
FEATURE A 1.50 1-JAN-99 5 KEY LINK P 1.00 OVERDRAFT=3,
MINIMUM=2, OPTIONS="FAILSAFE, CAPACITY"
FEATURE B 1.00 1-JAN-99 35 KEY LINK P 1.00 OVERDRAFT=3,
MINIMUM=2, OPTIONS="FAILSAFE, CAPACITY"

TABLE 2 where "FEATURE" designates the record as a license record, "X", "Y", etc. designates the name of the component, "3.00", "1.00", etc. designates the version number of the component, "1-JAN-1999" indicates the expiration date of the license, "10", "5", etc. designates the number of component licenses (license units) available, and "KEY" designates the synthesized key for each component license record. The string "LINK" indicates that the next two parameters are the name and version number of the package of which that component is a part. Alternatively, the link can be stored in an internal memory structure rather than in the license record. Other types of links or pointers can also be used in other embodiments. OVERDRAFT and MINIMUM specify license modifiers, and OPTIONS indicates any other licensing modifiers, such as fail safe and capacity. These modifiers are described in greater detail with reference to FIG. 7.

Figure 6:
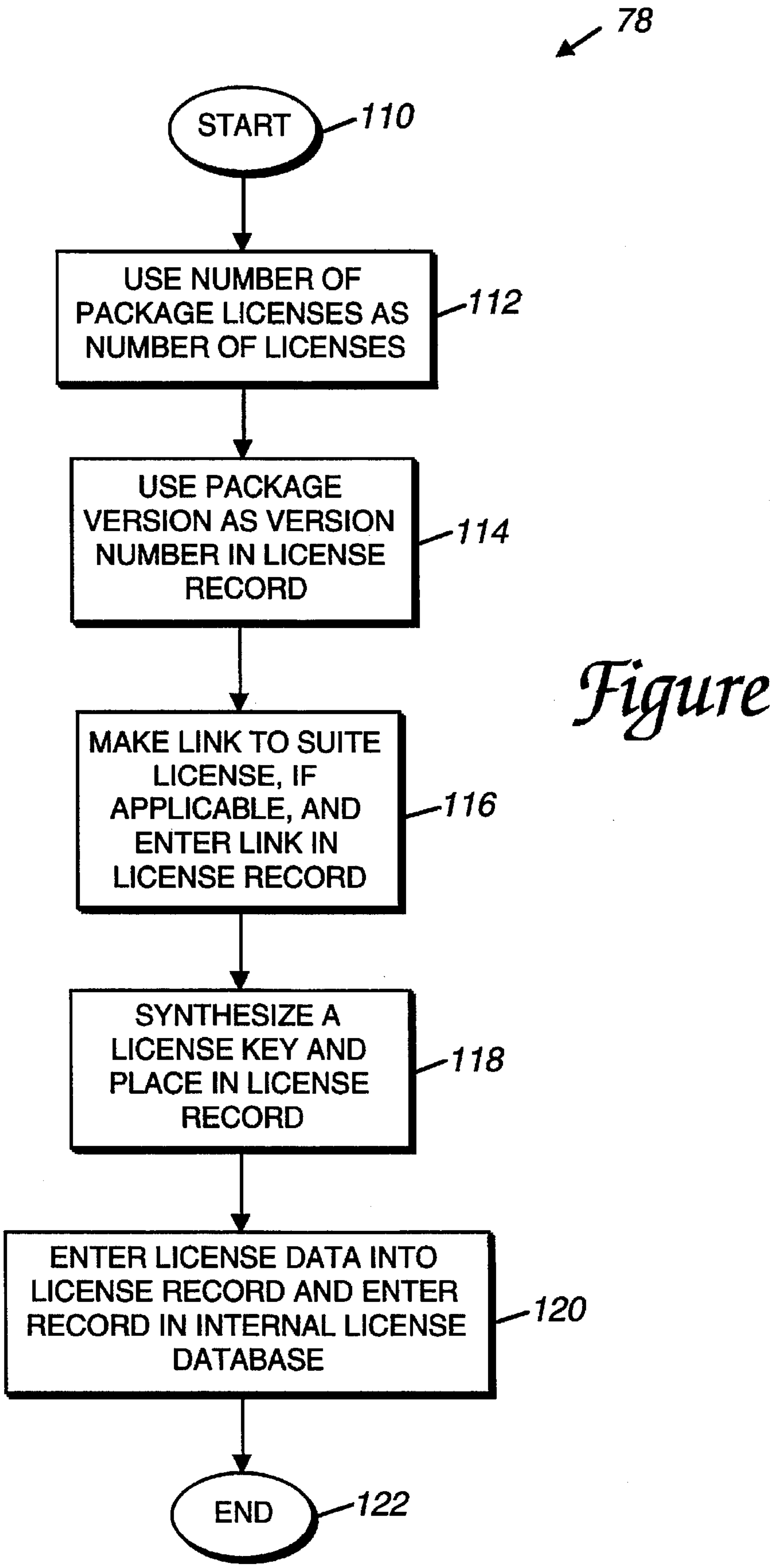
FIG. 6 is a flow diagram illustrating a method of creating and entering a license record in the license database for a suite (step 78 of FIG. 4)

FIG. 6 is a flow diagram illustrating step 78 of FIG. 4, in which a license record is created for a suite and entered into the internal license database. The process of creating a suite license record is similar to the process of FIG. 5 for creating a license record for a component program of a package. The process begins at 110. In step 112, the number of package licenses in the package license item 22 is used as the number of suite licenses and placed in the suite license record. In next step 114, the package version read from the package description 20 is used as the suite version number in the suite license record. In optional step 116, a link is made to the parent suite license record which includes the current suite. This is only applicable if the alternate embodiment is being used in which packages may be components of other packages. If such is the case, and the current suite is a component of a higher level suite, then a link to the higher level suite is added to the suite license record (or added to an internal memory structure). This link can be a name and version number, or a different pointer, as described above with reference to step 100 of FIG. 5.

In next step 118, a license key is synthesized for the suite and is placed in the license record. This step is substantially similar to step 102 of FIG. 5. In next step 120, package license data from the external file is entered into the suite license record and the suite license record is entered into the internal license database. This step is substantially similar to steps 80 and 104 of FIGS. 4 and 5, respectively, and is described in greater detail with respect to FIG. 7. The process is then complete as indicated at 122.

An example of a suite license record is shown below in Table 3:

FEATURE P 1.00 1-JAN-1999 5 KEY OVERDRAFT=3, MINIMUM=2,

OPTIONS="FAILSAFE, CAPACITY"

TABLE 3 where FEATURE designates this entry as a license record in the internal database, "P" designates the name of the suite covered by this license, "1.00" designates the version of the suite covered by this license, "1-JAN-1999" is the date that this suite license expires, "5" designates the number of suite licenses (license units) available, "KEY" designates the key identification sequence that was synthesized as explained above, and the modifier options indicate the options for the suite license. These modifiers are determined from the license data item 22. In other embodiments, different or additional information can be stored in a suite license record.

Figure 7:
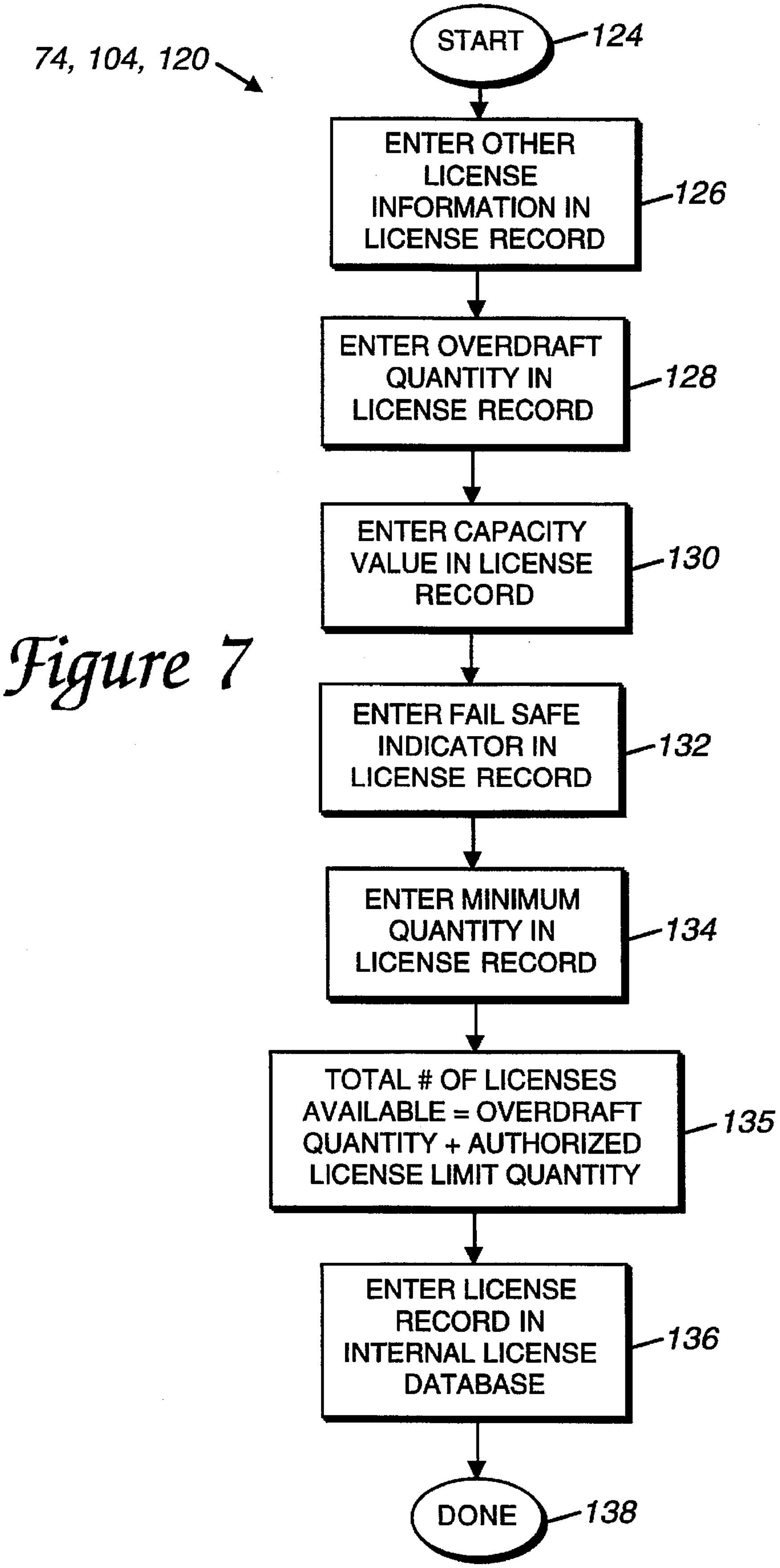
FIG. 7 is a flow diagram illustrating a method of entering license data into a license record and entering the license record in the license database (step 74 of FIG. 4)

FIG. 7 is a flow diagram illustrating step 74 of FIG. 4, step 104 of FIG. 5, and step 120 of FIG. 6, wherein information from the license item from the external file is entered into a license record and the license record is entered into the internal license database 19. The process of FIG. 7 is implemented for a standard license record, component license record, or suite license record. The process begins at 124, and, in step 126, other information in the license item is entered in the license record from the external file. This other information can include any information not specifically addressed in its own step, such as the date of expiration of the license,, as shown in Tables 2 and 3. Also, this other license information can vary depending on the type of license record being created. For example, a key for standard licenses can be pre-synthesized and stored in the external file. If a license record for a standard license is being created, the key can be copied into the license record from the license item along with the other license information. The key for suite license records and component license records, however, are preferably synthesized at the time of license record creation and stored in the license record instead of being retrieved from an external file. Alternatively, the keys for standard licenses can also be synthesized at the time of license record creation.

Steps 128, 130, 132, and 134 allow license record "modifiers" of the present invention to be entered in the license record depending on the options desired by the operator of the license management system. Some or all of the data used in these steps is stored with the license item read in step 66 of FIG. 4 if the operator of the license management system has opted for the features implemented by the modifiers.

In step 128, a license overdraft quantity is read from the license item and entered in the license record. License overdraft is a policy that allows users of licensed software to use more licenses than the users have purchased. For example, a software vendor selling a software product to a large, trusted company may wish to provide a more lenient policy which allows the company to use more licenses than the company purchased or was authorized to use. The amount of licenses over the authorized amount is considered the overdraft quantity. The overdraft quantity can be limited by the software vendor to a specific amount. This can stimulate additional use of the licensed product, further resulting in additional purchases of the product. In addition, the amount of usage over the authorized amount of licenses can be recorded for later business negotiations with the customer. If the overdraft quantity is desired to be infinity, then a special value or indicator, such as −1, can be entered in the license record.

In next step 130, a capacity indicator is read from the license item and entered in the license record. The capacity indicator indicates if the license record is a capacity license. This means that the license may cost more licenses or "license units" for some requesters than other requesters. Herein, "license units" refer to elements of value used in calculating how many licenses are available for a requested product and/or a client computer system, i.e. the cost (in units) of particular product in terms of available licenses. Typically, a number of license units will be available to check out, and program license requests check out a standard amount of license units, such as 1 unit=1 program license.

The capacity indicator can influence the standard amount of license units that are checked out for a license. For example, licenses for a designated program are available on a license server and can be implemented by two types of client hardware platforms that have access the license server. The first hardware platform is a slower, less expensive personal computer, such as an IBM-compatible PC. The second hardware platform is a more expensive, faster workstation, such as a SUN workstation. The SUN platform will be able to execute the program at a much faster rate so that less program usage may result; users will be able to complete their use of the program much faster. To compensate for this, the software vendor can provide a capacity indicator in the license for this program. When a client checks out a capacity license, the license server receives an "environmental resource capacity" of the client and multiplies that resource capacity by the number of license units required for that requester to check out a license. The resource capacity of a requester is a measure of the license consumption ability of a client computer system, and can be determined by different criteria in different embodiments. Hardware speed is preferably used to determine resource capacity of a requester, but monitor size, disk drive space, user identity, memory space, or other characteristics can be also used. Thus, the SUN platform might have a resource capacity of 2 and the IBM-PC might have a resource capacity of 1, thus causing the SUN platform to check out twice as many license units to obtain a license for the program. Typically, the resource capacity can be determined on the client computer system end and sent in the request to the license server.

In next step 132, a fail safe indicator is entered in the license record if the license item includes a fail safe indicator. The fail safe indicator allows licenses to be checked out when no licenses are available during failures. This can be beneficial during license management system failures, when normally no licenses would be available. For example, whenever a failure occurs in a license management system, licenses are typically denied to new requesters. However, a software developer selling a product to a large, trusted company may wish to provide a more lenient policy which allows the customer to check out licenses when an error occurs in the license management system. This could be especially important for mission-critical applications. In some embodiments, a fail safe license can be checked out regardless of the type of error. In other embodiments, the fail safe license can be checked out only when the error is an actual failure of the license system, and not when the client is denied a license due to the license policy (i.e. "no licenses available").

In next step 134, a minimum quantity is read from the license item and entered in the license record. The minimum is the minimum number of licenses (license units) that a particular license record requires to be used. The minimum value places a minimum cost in license units on a particular license. For example, if the amount of units required for a license for a program is determined to be one (after determining resource capacity), but the license record indicates the minimum is 2, then 2 license units must be available to check out a license for that program. The minimum license units allows the software vendor to decrease the amount of licenses available for specific programs regardless of resource capacity of the requester.

In step 135, the total number of license units available for that license record are calculated as the overdraft quantity from step 128 (if being used) plus the authorized license limit quantity. The authorized license limit is the number of licenses (license units) retrieved from the license item. In next step 136, the license record is entered in the license database, and the process is complete at 138.

Figure 8:
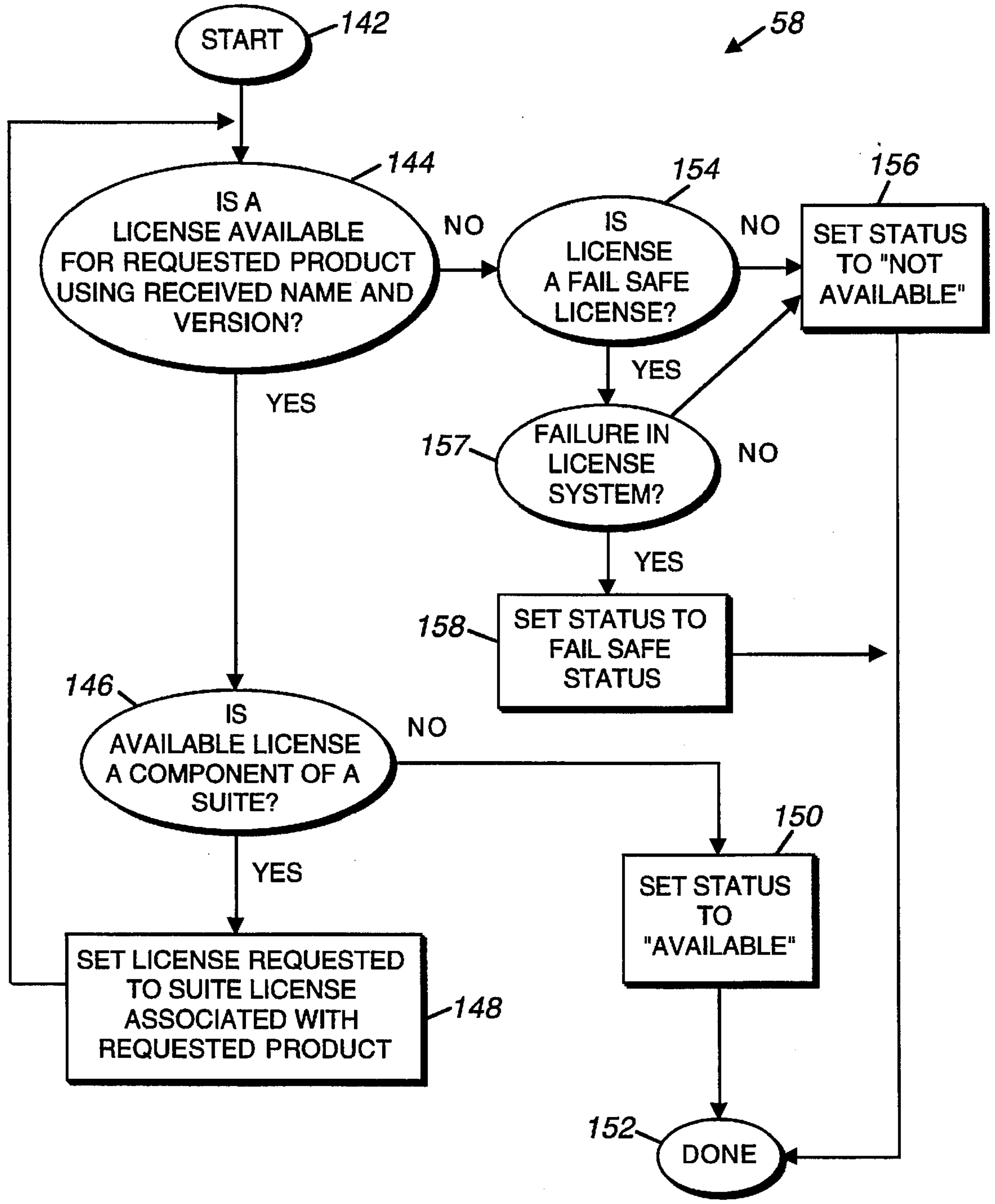
FIG. 8 is a flow diagram illustrating a method of processing a license request from a client (step 58 of FIG. 3)

FIG. 8 is a flow diagram illustrating step 58 of FIG. 3, in which a license request from a computer system is processed by the license server. The process begins at 142. In step 144, the process checks if a license is available for the designated product using the name and version received in the request. The license may not be available because the product is not present in the license database, because no more licenses are available for the requested product, or for a different reason (as in metering licenses, node-locked licenses, site licenses, etc.) The process of determining if a license is available for the requested product is described in greater detail with respect to FIG. 9. If the license(s) for the requested product is available, then, in step 146, the process determines if the available license is a component of a suite, i.e. is the requested product part of a suite which has a license record stored on the internal license database. If so, then step 148 is implemented, in which the license requested is set to the suite license associated with the requested component. After step 148, the process returns to step 144 to check if a license is available for that suite. Thus, both a component license and a suite license must be available to check out a license for a suite component. Also, in the alternate embodiment where suites may be components of suites, the process will recursively implement step 144 to check if all higher level suites for a component have a license available.

If, in step 146, the license checked in step 144 is not a component of a suite, then the process continues to step 150, where the status is set to "available." This status is output to the requesting computer system 12, which then preferably decides how to enforce the software policy depending on the status message received. Alternatively, the license server 16 can provide information on how to enforce the software policy, such as not allowing the designated program to be used. The process is then complete at 152.

If the license is not available in step 144, then step 154 is initiated (or step 156 is initiated directly after a special case in step 144, as detailed below in FIG. 9). In step 154, the process checks if the license of the requested product is a failsafe license. If not, then the status is set to "not available" in step 156, and this status is output to the requesting client computer system. The process is then complete at 152. If the requested license is a fail safe license in step 154, then step 158 is implemented, in which the process checks in step 157 if there has been a failure in the license management system, i.e., some nodes of the network are not operating, the license server has a failure in some subsystem, etc. If so, then, in step 158, the status is set to "fail safe" status and this status is output to the requesting client computer system. This indicates to the requesting client that the requested product is not available, but the client is allowed to use the product. The client can decide the action to take based on a fail safe status; for example, a fail safe message can be displayed to the user of the client system. The process is then complete at 152. In other embodiments where a fail safe license is always granted to the client, regardless of actual failure in the system, step 157 can be omitted.

If no failure has occurred in the license management system in step 157, or if the license is not a failsafe license in step 154, then, in step 156, the status is set to "not available," which indicates that the license for the designated product is not available and the client is not authorized to use the product. This status can then be output to the requesting client computer system. The process is then complete at 152.

If the user has checked out an overdraft license or a failsafe license, then preferably this information is logged by the license server in a file or database. The license provider can thus later refer to the log to determine how many overdraft and fail safe licenses were granted to clients. Other information can also be logged, such as time or activations remaining for use of the designated product by the client (in a metered policy), user name, host name, terminal name, product name, version number, etc.

Figure 9:
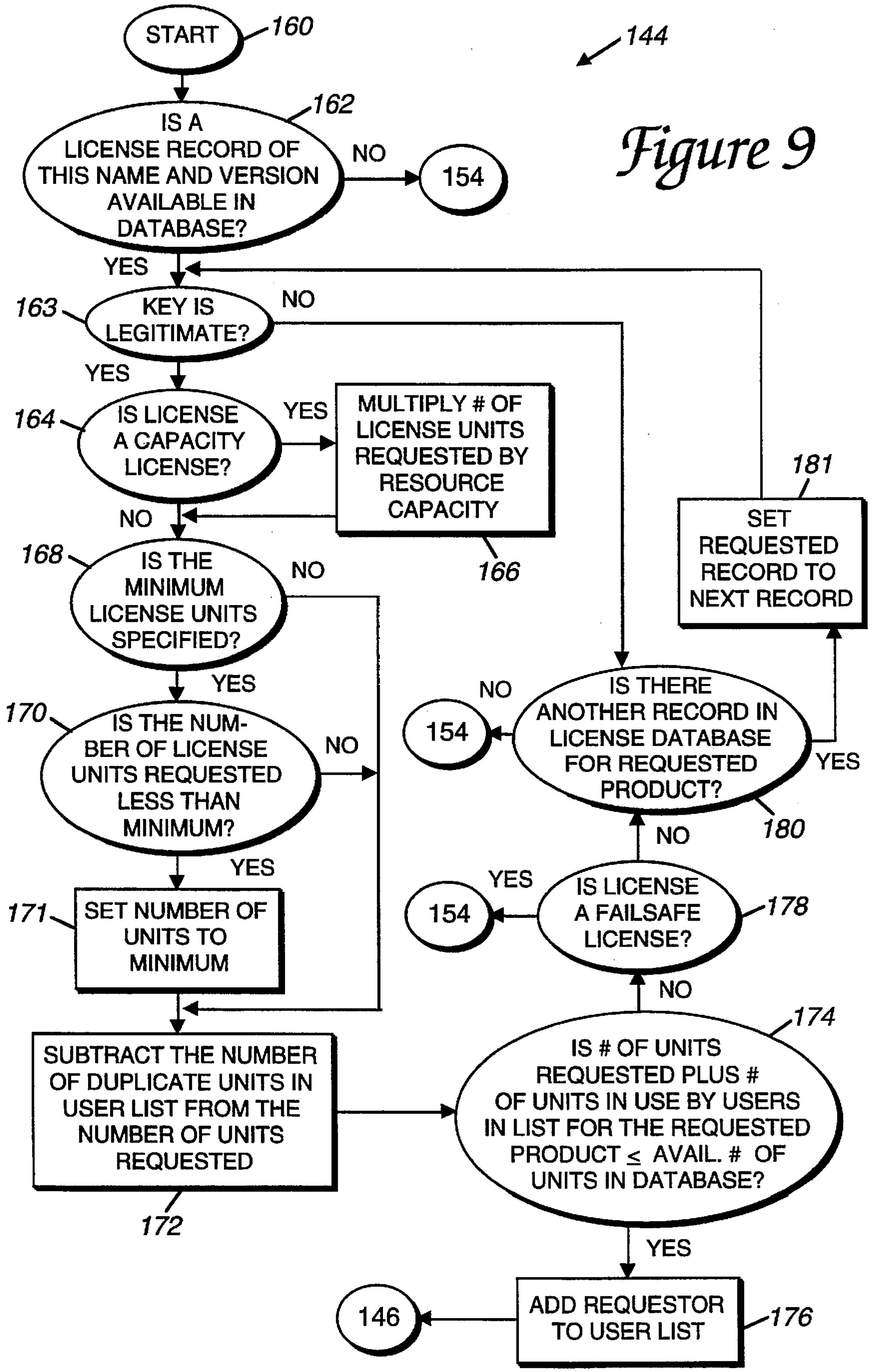
FIG. 9 is a flow diagram illustrating a method of determining if a license is available for a requested product (step 144 of FIG. 8)

FIG. 9 is a flow diagram illustrating step 144 of FIG. 8, in which the process checks if a license record is available for the requested product. The process begins at 160, and, in step 162, the process checks if the name and version number of the license for the requested product is available in the internal license database. In some embodiments, this can be a search for an exact match to the requesting name and version number. Alternatively, an inexact match can be found. For example, an exact name match and a match between a version number that is less than or equal to the version number of the requested product can be considered a match. This allows an older version of a product to be matched to license records for newer versions of the product. The license will not be available in the database when no license information has been provided for the requested product from the software vendor, or if a license record were not stored in the database for some other reason.

If there is not a license record for the requested product in the license database, then the process continues to steps 154 and 156 of FIG. 6 and the process is complete at 152 of FIG. 6 (since the license does not exist, it therefore cannot be a fail safe license, and step 154 is false).

If a license record is available in the database, then in optional step 163, the key stored in the found license record is verified to determine if the license record has not been tampered with and is legitimate, similarly to step 65 and 66 described above (step not shown). If the record is not legitimate, then step 180 is implemented. If the record is legitimate, step 164 is implemented, in which the process checks if the license record is a capacity license, i.e., if the license record includes a capacity indicator. If so, then step 166 is implemented, in which the number of license units requested by the requester are multiplied by the resource capacity of the requester. The number of license units requested can be more than one if, for example, the requester desires to use more than one copy of a program. The resource capacity can be provided by the client computer system or program and is calculated based on predetermined criteria, as described with reference to FIGS. 7 and 10. Alternatively, the resource capacity can be calculated by the license server based on information provided by the client, such as type of hardware platform, identity of user, etc.

After step 166, or if the license record is not a capacity license, then step 168 is initiated. The process checks if a minimum quantity of license units is specified in the license record. If not, then step 172 is initiated, described below. If a minimum is specified, then, in step 170, the process checks if the number of license units requested (as modified by resource capacity, if appropriate) is less than the minimum number of units. If not, step 172 is initiated, described below. If so, then the number of requested units is set to the minimum number in step 171.

After step 171, step 172 is implemented in some embodiments, in which the number of duplicate license units in the user list is subtracted from the number of license units requested. The "user list", as described herein, is a list of requesters that have requested the license record in question and are currently using a license, and includes the number of units that each such requester currently has checked out. Duplicate units are those units that are currently being checked out by the same user for the same license. This can occur when a user has previously requested a license, and is currently requesting another of the same license for the designated product. In some embodiments, the client may be allowed to request and receive the same license a number of times, but will not be required to check out additional license units each time the same license is requested. In such an embodiment, by subtracting the duplicate units from the number of units requested in step 172, the client will not be required to check out multiple license units for the same license.

In step 174, the process checks if the number of units requested plus the number of units currently checked out (i.e., in use by requesters in the user list for the requested product) is less than or equal to the total number of available units in the internal license database. This total number of available units is stored in the license record as described above in step 135 of FIG. 7, and may include overdraft license units if appropriate. If the result of step 174 is true, then there are sufficient license units available for the requester, and step 176 is implemented, in which the requester is added to the user list, i.e., the requester is considered to have checked out the requested number of license units. The process then continues to step 146 of FIG. 8. If the result of step 174 is not true, then there are not enough license units available. The process then continues to step 178, in which the process checks if the license is a failsafe license. If so, the process continues to step 154 and (automatically) to step 157 of FIG. 8.

Figure 10:
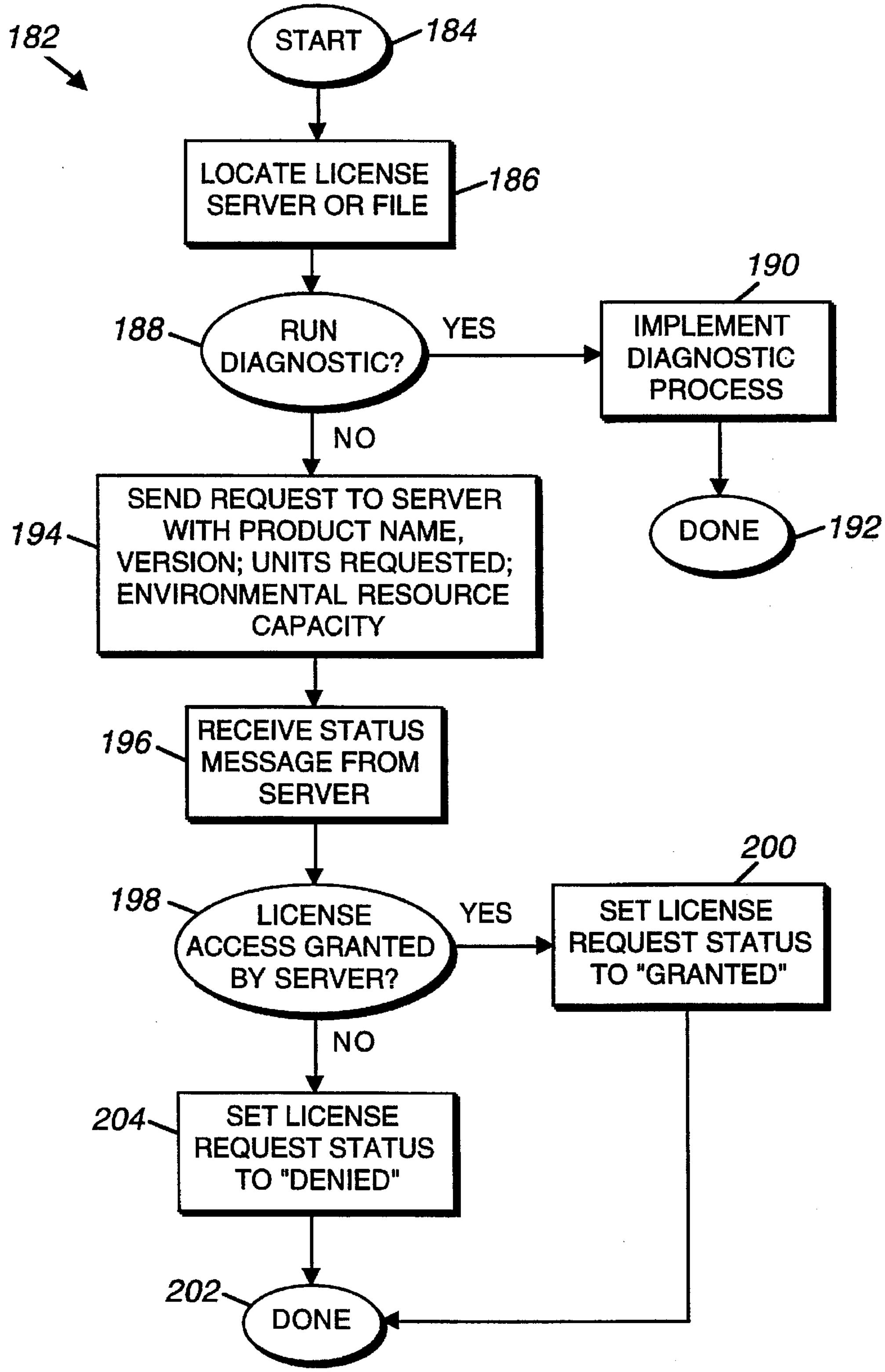
FIG. 10 is a flow diagram illustrating a method of the present invention for requesting a license from a client computer system.
Figure 11:
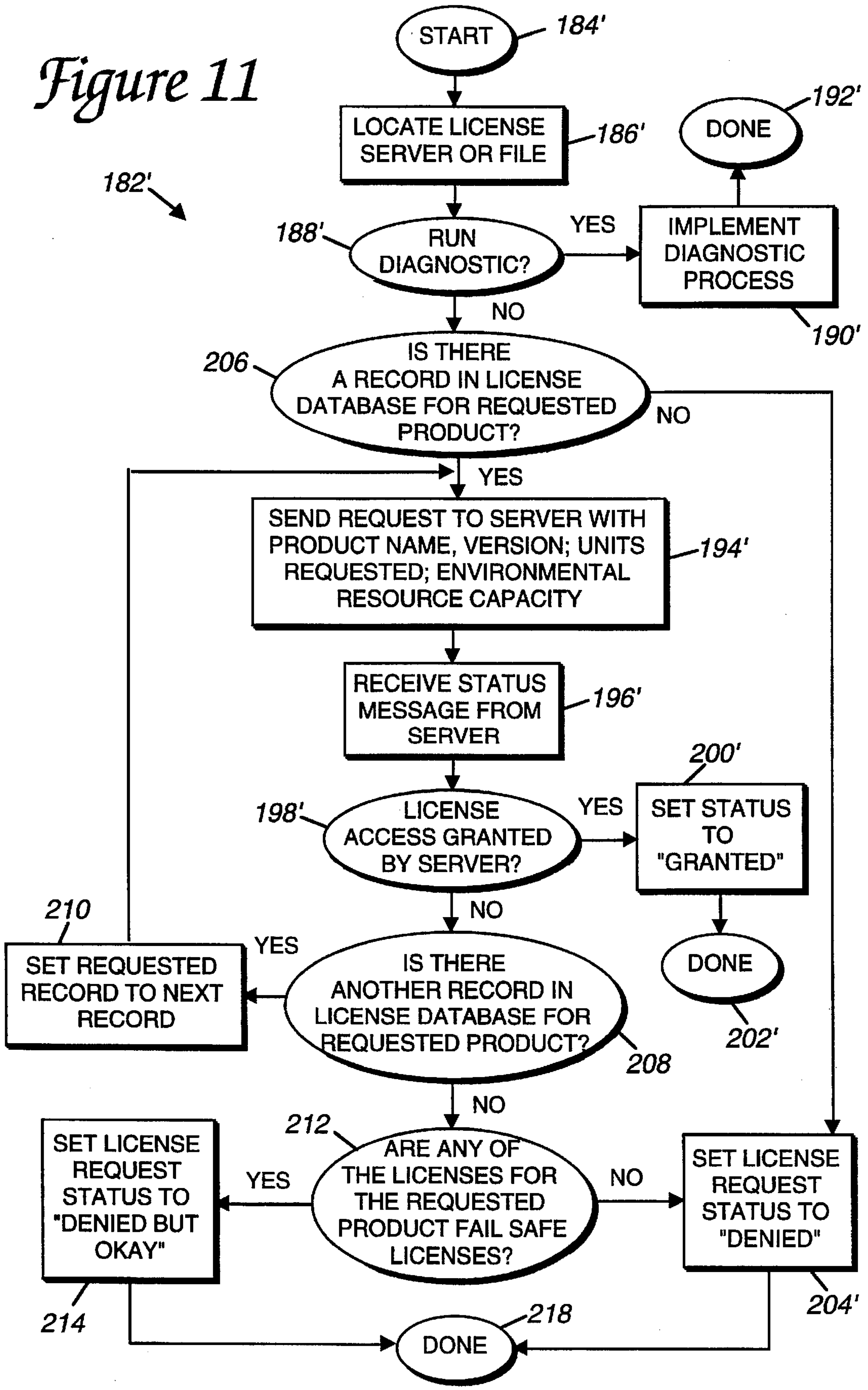
FIG. 11 is a flow diagram illustrating an alternate method of the present invention for requesting a license from a client computer system.

If the license is not a failsafe license, then the server checks in step 180 whether there is another, different license record in the internal license database for the requested product. For example, there may be a license record providing a number of license units for one version or "feature line" of the requested product. There may also be different license records in the database which provide license units for other versions or feature lines of the requested product. The client thus may be able to request a license for one of multiple license records for a requested product in the database. If no other license record is available for the requested product, the process returns to step 154 of FIG. 8. If another license record for the requested product is available, then step 181 is implemented, in which the license record for the requested product is set to the next record that matches the product that is stored in the database. The process then returns to step 164, described above. It should be noted that steps 180 and 181 should only be included in the process of FIG. 9 if the client requesting process of FIG. 10 is being implemented. Steps 180 and 181 should be omitted if the requesting process of FIG. 11 is being used, since, in FIG. 11, these steps are performed on the client side of the process instead of the server side.

It should be noted that the process above implements a "concurrent usage" policy so that only a predetermined number of licenses are allowed to be concurrently checked out. Other steps can be added to the process of FIG. 9, or can replace existing steps, to determine if the requestor should be granted a license. Such other steps can include checks for how much time is left on a license in a metered license policy, checks to determine if the correct user/client is requesting a license in a node-locked policy, and/or checks to determine if the user is from the correct site for the license in a site policy. The implementation of these policies is well known to those skilled in the art.

Note also that some of the steps of FIG. 9 can be implemented on the client computer system in addition to or instead of implementing these steps by the license server. For example, steps 164, 166, 168, 170, and 171 can be implemented by a license management program or process implemented on the client computer system using the license records in the license database (as in the embodiment described with reference to FIG. 11).

FIG. 10 is a flow diagram illustrating a method 182 for implementing a request for a license and other license management activities on a client computer system 12. This process can be implemented in software or hardware on the client computer system, or within a particular licensed program or product. The client computer system preferably includes standard components such as a microprocessor, RAM, ROM, input/output circuitry, a storage device, etc., as is well known to those skilled in the art. The process of FIG. 10 allows the client to send a request and receive a status concerning the availability of one or more licenses for a requested product. In the alternate embodiment of FIG. 11, described below, the client computer system can research the license database instead of the license server and request for a specific license from a license record.

The process begins at 184. In step 186, the license server or file is located by the client computer system. In the described embodiment, the license server is located at another node, having an address, on a network in which the client computer system is also located. There are a wide variety of methods to locate a license server on a network. One preferred method to locate the server is to use a license finder of the present invention, which is described in greater detail with respect to FIGS. 12 and 13. The license records can also be stored in a license file, which can be located at a network-accessible node.

In next step 188, the process checks if the user of the client computer system 12 wishes to run a diagnostic process of the present invention. This process implements tests the requesting of licenses and locates a license server or license file if the server or file cannot be located. If the user indicates to run the diagnostic, then step 190 is initiated, described in greater detail with reference to FIG. 14. The process is then complete as indicated at 192. In addition, the diagnostic step 190 can be initiated and run at any time the user is operating the client computer system.

If the diagnostic process is not run in step 188, then step 194 is implemented, in which a license request is sent to the license server including the name of the requested product, the product version number, the number of license units requested, and the environmental resource capacity (if being implemented). The environmental resource capacity is preferably determined prior to step 194 by either reading a resource capacity set by the operator of the license management system, or determining the resource capacity using an established method. For example, the resource capacity can be determined by examining the current hardware platform or other environmental resource. In addition, other information can be included in the license request as desired. For example, the user name, client identifier, site indication (in a site license policy), time or activations remaining (in a metered license policy), etc. The license request typically requests one license for a designated program; however, a request for multiple licenses can also be made in some embodiments. The request is typically output fight after the designated program is activated by the user on the client computer system; it can also be output at other times. In step 196, a status message is received back from the server.

In next step 198, the process examines the status message to determine if access has been granted by the license server to the license units requested in step 194. If license access has been granted, then the license request status on the client computer system is set to "granted" in step 200, and the process is complete 202. The designated product typically checks the status, determines that it is "granted" a license, and allows itself to be activated continues to run on the client. Alternately, a separate, dedicated license program running on the client can check the status and inform the designated product that it is allowed to be activated. If license access is denied by the license server in step 198, then step 204 is implemented, wherein the license request status is set to "denied." The process is then complete as indicated at 202. Thus, when the designated product is activated, the license request status is checked and the user is determined to have been denied a license. A warning is then issued and the designated product is allowed to be used (in a lenient enforcement license policy), or the designated product is not allowed to be used (in a strict enforcement license policy).

In addition, if fail safe and/or overdraft is being implemented, the server can send back indications of these conditions in step 196. The fail safe condition can be indicated by a fail safe status, as described with respect to step 158 of FIG. 8. A message can be displayed or provided to the user indicating that a fail safe condition has occurred, and that the requested product can be still used. An overdraft condition can be indicated by an overdraft signal. Preferably, the overdraft condition is displayed or provided to the user only when the user issues a command for an overdraft status, which can occur at any time while the requested product is being implemented by the user's client computer system. Alternatively, the overdraft condition can be automatically displayed by the client computer system immediately after receiving the license status message from the server in step 196.

FIG. 11 is a flow diagram illustrating an alternate method 182' for processing of a request for a license and other license management activities on a client computer system 12. Unlike the method of FIG. 10, method 182' allows the client computer system to have access to the database or file of license records.

The process begins at 184. In step 186', the license server or file is located by the client computer system, as described with reference to FIG. 10. In step 188', the process checks if the user of the client computer system 12 wishes to run a diagnostic process of the present invention. If so, then step 190' is initiated, in which the diagnostic process is implemented. This process is described in greater detail with reference to FIG. 14. The process is then complete as indicated at 192'.

If the diagnostic process is not run in step 188', then step 206 is implemented, in which the client computer system checks if there is a license record in the license database 19 (or file) for the requested product. The client checks the name and version number of license records in the internal license database for a match to the requested product. The client computer system can access the license database that includes all the license records as provided in the initialization step 54 of FIG. 3. The client computer system can retrieve the license database information from the server after the server has initialized the database, or during the process of FIG. 11 after step 186'. Each client on the licensing network can store the internal license database in memory or on a storage device. Alternatively, the client computer system can access the license database that is stored on the license server or license file over the network as needed.

If the client computer system determines that there is no license record in the license database for the requested product, then the process continues to step 204', described below. If there is a license record for the requested product, then step 194' is implemented, in which the request is sent to the license server with the product name, version number, number of license units requested, and the environmental resource capacity. This step is similar to step 194 of FIG. 10. Since the server maintains a user list having the number of license units currently checked out, the client sends a request to determine if license units for the requested product are currently available. In next step 196', the status message is received from the license server, and, in step 198', the client computer system checks the status message to determine if access to a license has been granted by the server. If so, then the license request status on the client is set to "granted" and the process is complete at 202'. If not, then, in step 208, the client determines if there is another license record in the internal license database for the requested product. This step is similar to step 163 of FIG. 9 (which should be omitted from FIG. 9 if the process of FIG. 11 is being used.)

If another license record for the requested product is stored in the license database, then step 210 is implemented, in which the license record for the requested product is set to the next record that matches the product that is stored in the database. The process then returns to step 194' to send another request to the license server. If there is not another license record in the license database, then, in step 212, the client checks if any of the licenses for the requested product are fail safe licenses. If so, in step 214, the license request status is set to a fail safe status of "denied but okay", meaning that a license is not available but the requested program may still be used. (optionally, a check for system failure, similar to step 157 of FIG. 8, can be implemented before step 214). The process is then complete at 218. If none of the license records for the requested product are fail safe licenses, then the license request status is set to "denied" in step 204' and the process is complete at 218.

Figure 12:
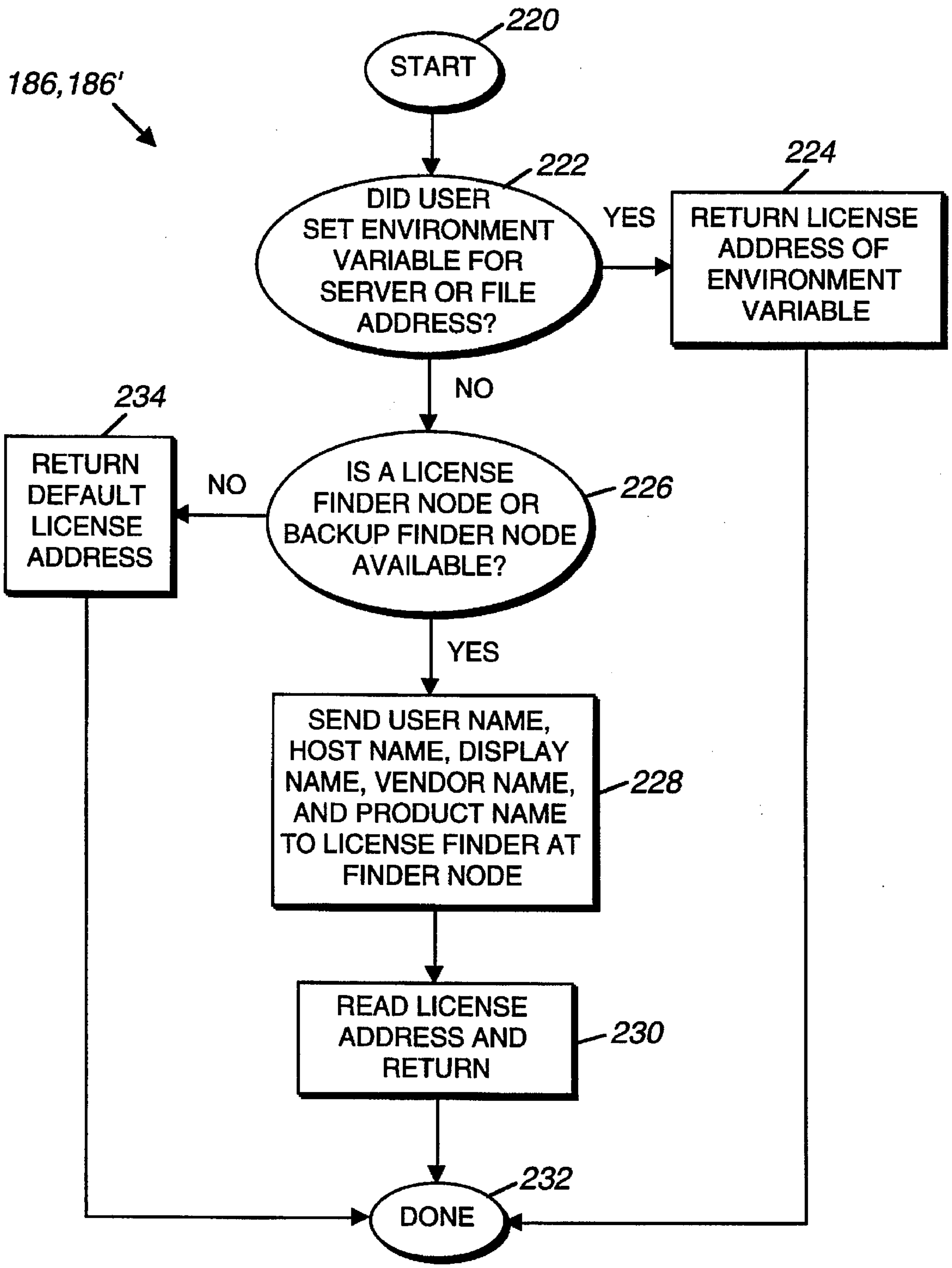
FIG. 12 is a flow diagram illustrating a method of locating a license server using a finder of the present invention (step 186 of FIG. 10)

FIG. 12 is a flow diagram illustrating one embodiment of step 186 and 186' of FIGS. 10 and 11, respectively, wherein the license server or file is located by the client computer system. In this embodiment, the license server or file can be located by having the client computer system access a dedicated "finder" process that is preferably located at an accessible node on the license network. A client can access the finder, which locates the license server for the client. Use of the finder allows a systematic, effective search for a server to be implemented with the most recent known location of the server regardless of the type or location of the client. In addition, the server can be moved to a different node in the network and only one process on the network, the finder, need be updated by the operator to include the new location of the server.

The process begins at 220, and, in step 222, the client checks if the user has set an environment variable of the client computer system that provides an address of the license server or file. The user can set the environment variable if the address of the server is known by the user. In such a case, the license server or file location on the network is known, and, in step 224, the license address of the environment variable is returned to the client process of FIG. 10 or 11. The "license address" is the location of the license server or license file on the network of the license management system. The process is then complete at 232.

If the user did not set the license address environment variable in step 222, then step 226 is implemented, in which the client checks if a license finder node, or a backup finder node, is available. The client computer system can send requests out over the network at one or more finder addresses that are stored on the client computer system. For the finder to be available, the client computer system should preferably be able to translate the address of the finder and determine if the finder node can be accessed on the network. If a primary finder is not available, then the client computer system can check if a backup finder node is available, assuming a backup finder is implemented in the license management system. The backup finder is in all respects a standard finder, except that it is only accessible when a primary finder is not available.

If a finder node is available, then in step 228, parameters including the user name, host name, terminal name, vendor name, and name/identifier of the designated product on the client computer system are preferably sent to the finder. Some or all of these parameters can be sent in step 228, depending on the specific embodiment; additional parameters defining the product or client can also be sent. The host name is the name of the client computer system processor unit, the terminal name is the name of the keyboard/display screen I/O station where the user is operating the client, and the vendor name is the name of the vendor of the software product that is running (the vendor of the designated product). The host and terminal can be combined in one device or location in some embodiments. The finder uses this information to determine the license address of the correct server or file for the client, as described with reference to FIG. 13. In next step 230, the license address is read from the finder and is returned to the client request process of FIG. 10 or 11. The process is then complete at 232.

This license address can be one of a number of different forms. For example, in the embodiment of FIG. 10, just the server address can be provided to the client, so that the client can send out a request to that address to receive a license. In the embodiment of FIG. 11, the finder can provide a file to the client including one or more license addresses, so that the client can read the lines in the file to determine a license server's host name, ID, port on the network, etc. This file includes the license server address as well as the license data. Alternatively, the client of FIG. 11 can receive a single server address like the client of FIG. 10.

If a finder node is not available in step 226, then a default license address is returned to the client request process of FIG. 10 or 11. The default license address can be the address value normally used when attempting to communicate with the license server, such as the last known location of the license server or file. The client requesting process of FIG. 10 or 11 can thus try to locate the license server or file with that default address. The process is then complete as indicated at 232.

Figure 13:
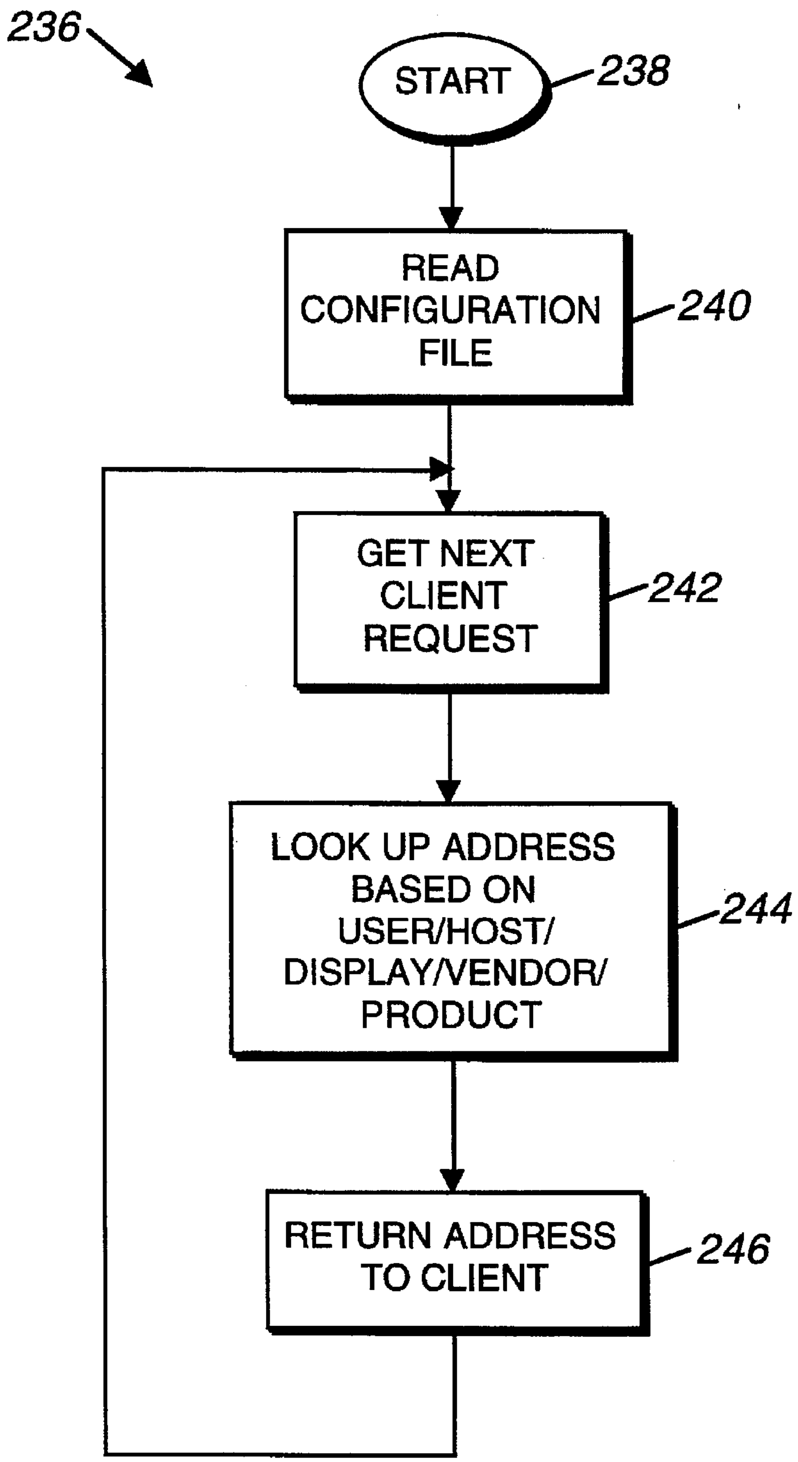
FIG. 13 is a flow diagram illustrating a method of implementing the license finder of the present invention.

FIG. 13 is a flow diagram illustrating a process 236 of providing a license address for a client using a license finder as described in FIG. 12. The process of FIG. 13 is preferably implemented on a finder that is available to any client computer system over the license network. The finder can be implemented on a computer, system (or a license server) connected to the license management network including CPU, memory, and other components similar to those included in client computer systems 12 and server 16. The process begins at 238, and in step 240, a configuration file is read by the finder. This configuration file includes information mapping parameters such as a user, host, terminal, vendor and/or software product name to a license address. For example, the configuration file may include the license server address to give to user Joe Smith (user name) when operating a SUN product (vendor name). Thus, if user Joe Smith running a SUN product requests a license address, the configuration file provides a particular server address to give to that particular client. The configuration file can include additional parameters relating to the client or product in alternate embodiments. Using the configuration file, the operator of the license management system can map certain types of hosts, users, terminals, etc. to particular license servers or files.

In step 242, the finder waits for and receives the next client request for a license address. As described in step 228 of FIG. 12, the request can include one or more of the parameters defining the client. In step 244, the finder looks up the license address in the configuration file based on the received user name, host, terminal, vendor, and/or product name, or any combination of these parameters as determined by the operator of the license management system. A default license address also can be specified for clients that do not match any parameters in the configuration file (or for all clients if parameters are not being implemented). In step 246, the license address found in the configuration file is returned to the client over the network, and the process returns to step 242 to get another client request for a license address.

Figure 14:
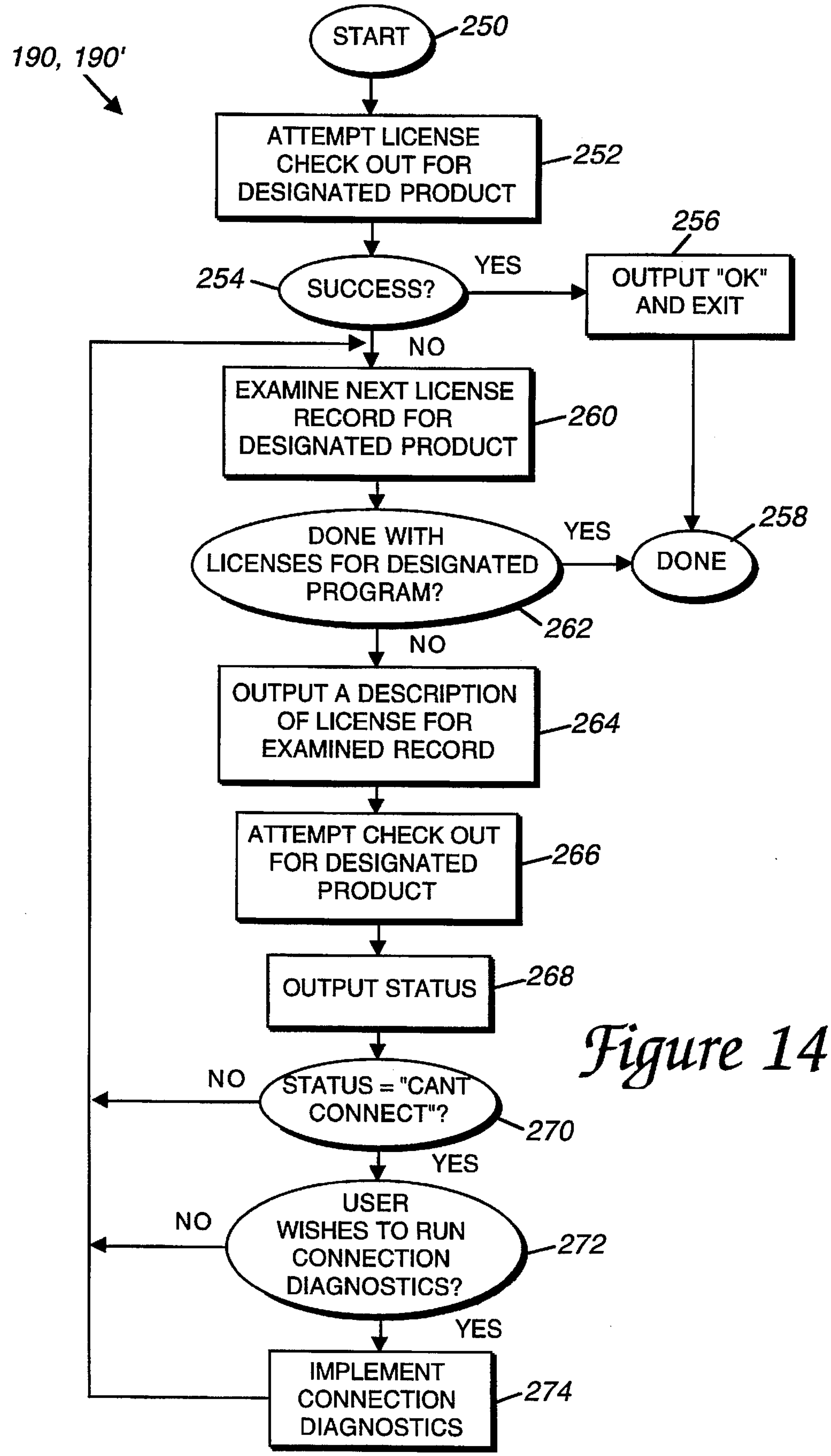
FIG. 14 is a flow diagram illustrating a method of implementing a diagnostic process of the present invention (step 190 of FIG. 10)

FIG. 14 is a flow diagram illustrating step 190 and 190' of FIGS. 10 and 11, in which a diagnostic process is implemented for a user on a client computer system. The process begins at 250, and in step 252, the diagnostic process attempts to check out (request and receive) a license for a designated product. The user can designate any program normally available at that client computer system. The check out is preferably accomplished using the client process of FIG. 10 or FIG. 11; in the described embodiment, the process 190 assumes that a list or database of license records is available to the client as in the method of FIG. 11. Alternatively, the process of FIG. 10 or the server process of FIG. 3 can provide output diagnostic information on license records as described below (the process of FIG. 10 can also run the connection diagnostics of step 274). In step 254, the diagnostic process checks if the license was successfully granted; if so, then step 256 is implemented, in which an "OK" message is output to the user and the diagnostic process is exited. The process is thus complete at 258.

If the license is not successfully granted to the client in step 254, then, in step 260, the diagnostic process examines the next license record in the database of license records for the designated product. The "next" license record is another license record that can be matched to the name and version of the designated product, similar to step 208 of FIG. 11. In step 262, the diagnostic process checks if all license records for the requested product have been checked. If so, the process is complete at 258. If not, then, in step 264, a description of the license for the examined license record is output by the diagnostic process to the user. The outputted license description includes the name, version, number of license units provided, any overdraft, fail safe, minimum, and capacity indicators or values, date of expiration, and any other relevant information found in the license record. The license description can be output in different mediums, such as a display on a display screen, a printout on paper, data written to a storage device such as a disk drive, etc.

In next step 266, a request for the examined license record for the designated product is attempted by the diagnostic process. This step is substantially similar to step 252, described above. In step 268, the status of the request is output by the diagnostic process. This status can be the normal license status returned by the license server, such as "granted" or "denied". If "denied", this status can include the reason for the denial, such as all the licenses are currently in use, the client is node-locked from the license, or the client's metered license time has been depleted. This output status can also be an error message or other message preventing the normal status from being received. In step 270, the process checks if the status of the request is a "can't connect" error message, which indicates that the client cannot find the license server or file on the network. If this status is not "can't connect", then the process returns to step 260 to examine the next license record for the designated product. If the status is "can't connect,", the process checks in step 272 whether the user wishes to implement the connection diagnostics. If not, the process returns to step 260; if so, the process continues to step 274, wherein the connection diagnostics are implemented by the diagnostic process. Since a "can't connect" error can be caused due to a number of different reasons, the connection diagnostics help determine the causes for the error. The connection diagnostics are described in greater detail with respect to FIG. 14. After the connection diagnostics are complete, the process returns to step 260.

Figure 15:
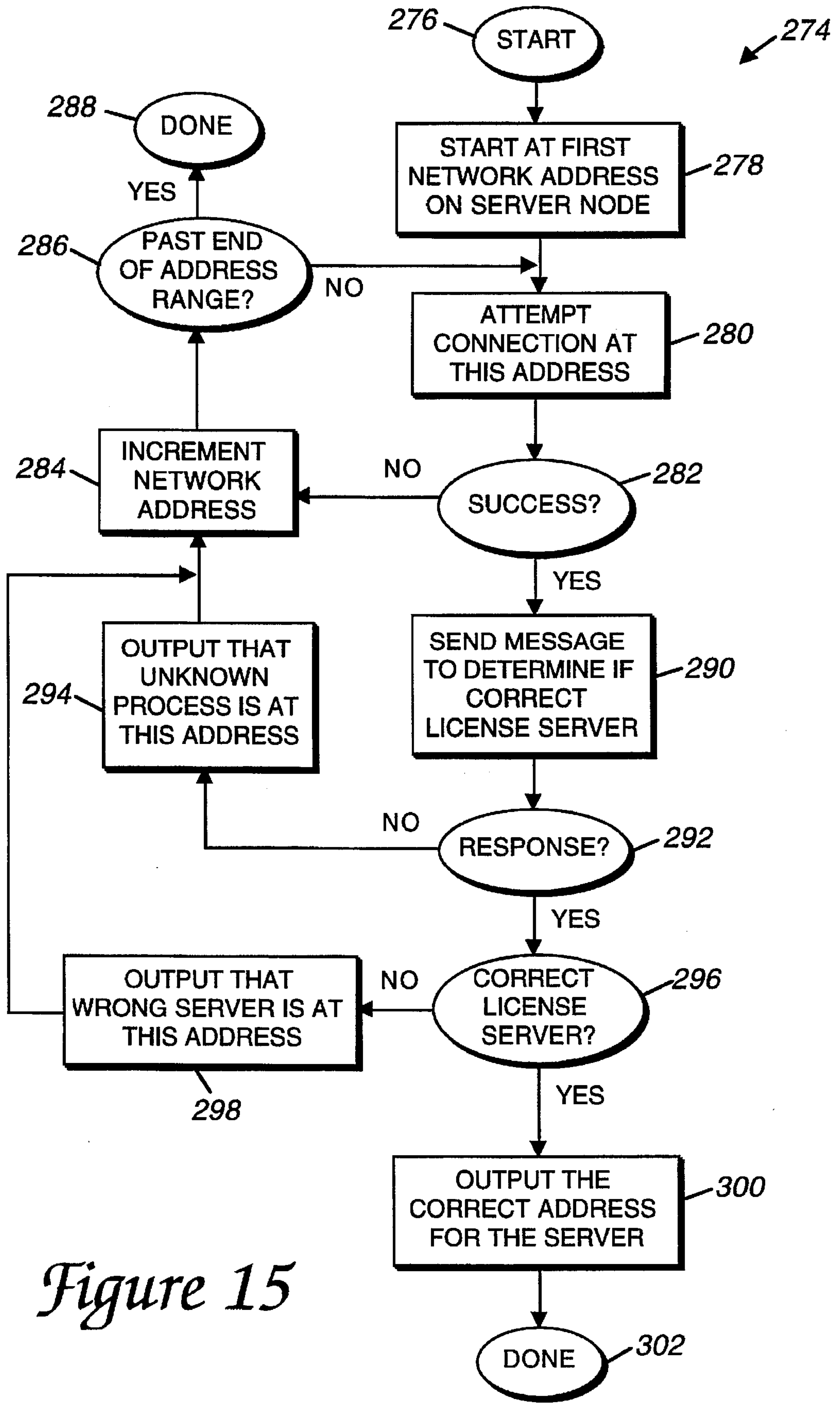
FIG. 15 is a flow diagram illustrating a method of implementing the connection diagnostics of the diagnostic process of FIG. 14.

FIG. 15 is a flow diagram illustrating step 274 of FIG. 14, in which the connection diagnostics are implemented by the diagnostic process. The process begins at 276. In step 278, the first network address on the network is obtained. This address is the first possible address at which the license server or file could be located, such as "0". In step 280, a connection to the license server or file is attempted at this network address. In step 282, the results of the connection are checked. If no connection was made, the process continues to step 284, where the network address is incremented to (or changed to) the next viable address. In step 286, the process checks if the new address is past the end of the network address range. For example, a network may have addresses ranging from 0 to 65,534. If past the address range, the process is complete at 288. If not past the address range, then step 280 is again implemented to attempt a connection at the new address.

Once a successful connection has been made at a network address, the process continues to step 290 from step 282. In step 290, a message is sent to the address to determine if a connection has been made to the correct license server for the designated product (if multiple license servers are available). If no response is received in next step 292, then in step 294 the process outputs that an unknown process is at the current network address. The process then continues to step 284 to increment the network address as described above. If a response is received in step 292, then the process checks if the response is from the correct license server. If not, in step 298, the process outputs that the wrong license server is at the current network address. The process then continues to step 284 as described above. If the response is from the correct license server in step 296, then the current network address is output with a message stating that this network address is the correct address for the license server of the designated product. The process is then complete at 302.

Although only one embodiment of the present invention has been described in detail, it should be understood that the present invention may be embodied in many other specific forms without departing from the spirit or scope of the invention. Particularly, the license management system configuration described can be adapted to a wide variety of network layouts and configurations. In addition, the license server functions can be provided by a single computer system or several different systems, and can even be incorporated into a client computer system. Further, the types of requesters can be widely varied, from personal computer systems, terminals, other servers, or any CPU-based computer. The embodiment described contemplates an internal license database; however, as should be appreciated by those skilled in the art, license data can be stored in a variety of locations and devices.

Therefore, the present examples are to be considered as illustrative and not restrictive, and the invention is not to be limited to the details given herein, but may be modified within the scope of the appended claims.

What is claimed is:

1. A method for initializing a license database including licenses for software products available to be checked out by clients wishing to use said software products, the method comprising the steps of:

receiving a license item including a license associated with a software product;

checking whether said license item is a package license item associated with a package, or a standard license item;

when said license item is a standard license item, entering said license item as a standard license record in a license database; and when said license item is a package license item, creating a component license record in said license database for an associated component software product included in said package, said component license record being created from said package license item.

2. A method as recited in claim 1 wherein said license records each include a number of licenses available for said product associated with said license record, said number of licenses being able to be checked out by a client requesting a license for said software product associated with said license record.

3. A method as recited in claim 2 further comprising a step of receiving at least one package license description before said step of receiving said license item, said package license description being associated with said package license item and including a component license description for said component product of said package, wherein said component license record created in said license database is created from said associated package license description and said package license item.

4. A method as recited in claim 3 wherein said package license description includes a suite indicator for indicating when said package license item is a suite license item, such that when said step of creating a component license record is accomplished, a suite license record for said suite license item is also created in said license database.

5. A method as recited in claim 4 wherein when a license provided by said suite license record is checked out by a client, no other client may use a license provided by said component license records linked with said suite license record unless another license provided by said suite license record is checked out.

6. A method as recited in claim 4 wherein said component license record includes a link to said suite license record.

7. A method as recited in claim 6 wherein said component license record and said suite license record include a number of license units indicating a number of times a license may be checked out from said license database by a client, wherein when a license provided by said component license record is checked out, a license provided by said suite license record linked to said component license record is also automatically checked out.

8. A method as recited in claim 3 wherein said component license description includes a name of a software product and a version number of said software product, said software product being a software program.

9. A method as recited in claim 3 wherein said component license description includes a name of a software product and a version number of said software product, said software product being a package.

10. A method as recited in claim 8 wherein said component license description includes a license multiplier for determining how many times said component license record may be checked out from said license database by a client.

11. A method as recited in claim 8 wherein a key is synthesized and stored in said component license record, said key being used to verify the validity of said license for said component when a client requests said license.

12. A method as recited in claim 3 further comprising steps of:

determining when a client requests a license to operate a software program, said license; being provided by a license record stored in said license database; and providing said license to said client when said license is determined to be available for said client.

13. A method as recited in claim 2 wherein an overdraft quantity is stored in said license record, said overdraft quantity indicating a number of licenses that can be provided to clients over the amount of licenses stored in said license records.

14. A method as recited in claim 2 wherein a fail safe indicator is stored in said license record, said fail safe indicator indicating that licenses over the amount of licenses stored in said license record can be provided to clients when a failure occurs in a license management system, said license management system including said license database and said clients.

15. A method as recited in claim 7 wherein a minimum indicator is stored in said license record, said minimum quantity indicating a minimum mount of license units required to check out said license provided by said license record.

16. A method for providing licenses to client computer systems to allow said client computer systems to use licensed software products, the method comprising the steps of:

receiving a request for a component license for a component product included in a package, said request being received from a client computer system that wishes to use said component product;

granting a package license to said client computer system when said client computer system is allowed to receive said package license according to a license policy, said package license being associated with said package that includes said requested component product, said package license allowing said client computer system to use said requested component product; and denying said component license and said package license to said client computer system when said client computer system is not allowed to receive said component license or said package license according said license policy.

17. A method as recited in claim 16 wherein said package includes a plurality of component products.

18. A method as recited in claim 17 further comprising a step of preventing different client computer systems from receiving a component license for a component product included in said package when a component license for a component product included in said package is requested by said different client computer system.

19. A method as recited in claim 17 wherein said step of denying said component license and said package license is not performed when said component license or said package license is a fail safe license.

20. A method as recited in claim 17 wherein said component license and said package license are each included in a license record, wherein each license record includes a number of license units indicating the number of licenses that each license can provide to different client computer systems.

21. A method as recited in claim 20 wherein said license record includes a capacity indicator, wherein when a license record includes a capacity indicator, that license record provides a number of licenses dependent on a resource capacity of said requesting client computer systems.

22. A method as recited in claim 18 wherein when said package license is granted, said client computer system is added to a user list for said requested product.

23. A method as recited in claim 22 wherein said client computer system is determined to be granted a license for said package when a number of licenses requested plus licenses in use by client computer systems in said user list is less than or equal to the available number of licenses for said requested product.

24. A software license server suitable for use in conjunction with a computer system and operative to provide licenses to said computer system to allow said computer system to use licensed software programs, the license server comprising:

a database for storing a plurality of program licenses and suite licenses;

means for receiving a request for a program license for a designated program, said request being received from a user on a client computer system that wishes to use said designated program;

means for determining whether said designated program is a component program in a suite;

means for providing a status message indicating to said client computer system whether said requested license has been granted or denied, said requested license being granted when a program license on said database is available for said designated program, wherein when said designated program is a component program in a suite, said requested license is granted when a suite license is available for said suite, and wherein when said requested license is granted, said client computer system is allowed to use said designated program.

25. A software license server as recited in claim 24 wherein said program licenses and said suite licenses are organized into an amount of available license units, wherein when a license is granted, a license unit is used and said available license units are decreased in amount.

26. A software license server as recited in claim 25 wherein said program licenses and said suite licenses are stored as license records on said database, each of said license records providing an amount of said license units.

27. A software license server as recited in claim 25 wherein said license records include a minimum quantity that indicates a minimum amount of license units that are used when a license for said license record is granted.

28. A software license server as recited in claim 25 wherein said license records include an overdraft quantity that indicates a amount of license units that can be used over the amount of available license units for a license record.

29. A software license server as recited in claim 25 wherein a license record may include a fail safe indicator that indicates that an unlimited number of license units may be used for said license record, wherein when no license units are available for said license record, a fail safe status is provided in said status message.

30. A software license server as recited in claim 25 wherein a license record may include a capacity indicator that indicates that when a request for a license of said license record is granted, an amount of license units are used equal to an environmental resource capacity of said client computer system multiplied by the number of requested license units.

31. A computer readable medium containing program instructions for:

sending a request to a license server, said request requesting a license for a designated product which is desired to be used on a computer system, wherein said request includes an environmental resource capacity of said computer system, said resource capacity determining how many licenses are required by said computer system to use said designated product; and receiving a status message from said license server, said status message providing information about whether said requested license has been granted or not, such that a license policy associated with said designated product may be enforced based on said information in said status message.

32. A computer readable medium as recited in claim 31 wherein said license policy does not allow said designated program to be used on said computer system when said requested license has not been granted.

33. A computer readable medium as recited in claim 31 wherein said license policy provides a warning on said computer system and allows said designated product to be used when said requested license has not been granted.

34. A computer readable medium as recited in claim 31 wherein said environmental resource capacity is a value based on the processing speed of said computer system, such that when said processing speed is high, said resource capacity is increased and said designated product requires additional licenses to be used on said computer system.

35. A computer readable medium as recited in claim 31 wherein said designated product is a component program in a package, and wherein when a license is granted for said component program, a separate license is also granted for said package.

36. A computer readable medium as recited in claim 31 further comprising a step of locating a license server on a network, said step of locating a license server including sending a request to a finder located on said network to provide a license address for said license server.

37. A computer readable medium as recited in claim 36 wherein when said finder cannot be located on said network, a default license server address is used to locate said license server.

38. A computer readable medium as recited in claim 31 wherein said program instructions for locating, sending and receiving are implemented as part of a diagnostic process on said computer system.

39. A computer readable medium as recited in claim 38 wherein said diagnostic process includes connection diagnostics for checking addresses on said network to find said license server when said license server cannot be located.

40. A computer readable medium as recited in claim 31 wherein said program instructions further access a list of license records, wherein a license record that matches said designated product is selected and wherein said request is for a license provided by said matched license record.

41. A computer readable medium as recited in claim 40 wherein when said request for said license is not granted, another license record in said list that matches said designated product is selected and a request for a license provided by said license record is sent to said license server.

42. A method for providing licenses to client computer systems to allow said client computer systems to use licensed software products, the method comprising the steps of:

receiving a request for a license for a software product, said request being received from a client computer system that wishes to use said software product;

determining when said client computer system is allowed to receive a license according to a license policy;

providing a granted license status to said client computer system when said client computer system is allowed to receive said license according to said license policy, said granted license status allowing said client computer system to use said software product;

when said client computer system is not allowed to receive said license according to said license policy, providing a granted license status to said client computer system when an overdraft license for said software product is available; and providing a denied license status to said client computer system when said client computer system is not allowed to receive said license according to said license policy and no overdraft license for said software product is available.

43. A method as recited in claim 42 further comprising a step of determining how many overdraft licenses are available for said software product by checking how many overdraft licenses have been provided to different client computer systems.

44. A method as recited in claim 43 wherein a number of available licenses for said software product are stored in a license record, and wherein a number of overdraft licenses for said software product are stored in said license record.

45. A method as recited in claim 42 wherein when said granted license status is provided, said client computer system is added to a user list for said software product, and wherein said client computer system is provided a granted license status when a number of licenses requested plus licenses in use by client computer systems in said user list is less than or equal to the available number of licenses plus the available number of overdraft licenses for said software product.

46. A method as recited in claim 42 wherein said granted license status is provided when a minimum mount of licenses are available to received by said client computer system when said client computer system is allowed to receive said license according to said license policy, said minimum amount being dependent on an identity of said designated product.

47. A method as recited in claim 42 further comprising a step of providing a granted fail safe license status to said client computer system when said license is a designated fail safe license, when said client computer system is not allowed to receive said license according to said license policy, and when no overdraft license for said software product is available.

48. A method as recited in claim 42 wherein said request from said client computer system includes an environmental resource capacity of said client computer system, said resource capacity determining how many licenses are required by said computer system to use said designated product.

49. A computer readable medium containing program instructions for:

(a) receiving a request for a license for a software product, said request being received from a client computer system that wishes to use said software product;

(b) determining when said client computer system is allowed to receive a license according to a license policy;

(c) providing a granted license status to said client computer system when said client computer system is allowed to receive said license according to said license policy, said granted license status allowing said client computer system to use said software product;

(d) providing a granted fail safe license status to said client computer system when said client computer system is not allowed to receive said license according to said license policy and when said license is a fail safe license; and (e) providing a denied license status to said client computer system when said client computer system is not allowed to receive said license according to said license policy and when said license is not a fail safe license.

50. A computer readable medium as recited in claim 49 wherein said granted fail safe license status is provided to said client computer system only when a failure occurs in a license management system that includes a plurality of client computer systems and implements steps (a) through (e).

51. A computer readable medium as recited in claim 50 wherein said failure in said license management system is a computer network failure.

52. A computer readable medium as recited in claim 49 wherein said license policy does not allow a client computer system to receive a license when none of a number of available licenses is currently available for said software product, said licenses having been previously provided to different client computer systems.

53. A computer readable medium as recited in claim 52 wherein said granted license status is provided to said client computer system when none of said available licenses is currently available and when a number of overdraft licenses are available for said software product.

54. A computer readable medium as recited in claim 52 wherein a minimum number of licenses are required to be available for said client computer system when requesting said license for said software product, said minimum number being dependent on an identity of said software product.

55. A software license server suitable for use in conjunction with a computer system and operative to provide licenses to said computer system to allow said computer system to use licensed software programs, the license server comprising:

a database for storing a plurality of license units available for a designated software product;

means for receiving a request for a license for said designated software product, said request being received from a user on a client computer system that wishes to use said designated product;

means for determining when said client computer system is allowed to receive said license according to a license policy;

means for checking out a minimum number of license units for said designated product when said client computer system is allowed to receive said license according to said license policy, said minimum number being dependent on said designated product;

means for providing a granted license status to said client computer system when said minimum number of license units are available to be checked out, said granted license status allowing said client computer system to use said designated product; and means for providing a denied license status to said client computer system when said minimum number of license are not available to be checked out.

56. A software license server as recited in claim 55 wherein said minimum number is designated by a licensor of said license for said designated software product.

57. A software license server as recited in claim 55 wherein said minimum number of licenses units are not available to be checked out when a different client computer system has checked out said license units.

58. A software license server as recited in claim 55 wherein when a license unit is checked out, said available license units are decreased in amount.

59. A software license server as recited in claim 57 wherein said license units are stored in a license record on said database, each of said license records providing an amount of said license units.

60. A software license server as recited in claim 59 wherein each of said license records stores an indication of a minimum number of license units.

61. A software license server as recited in claim 55 wherein said means for providing said granted license status provides said granted status to said client computer system when none of said license units are available to be checked out and when a minimum number of overdraft licenses for said software product are available to be checked out.

62. A method for diagnosing problems in a license management system, the method comprising the steps of:

(a) receiving a diagnose command on a client computer system connected to a network;

(b) attempting to locate a license server on said network in said license management system, said license server being operative to provide licenses to client computer systems on said network that wish to use licensed software products;

(c) when said license server is located, sending a request to said located license server, said request requesting a license for a designated product which is desired to be used on a client computer system;

(d) outputting a diagnosis description on an output device based on results obtained from said steps (b) and (c).

63. A method as recited in claim 62 wherein a list of license records is accessed in step (c), wherein a license record that matches said designated product is selected and wherein said request is for a license provided by said matched license record.

64. A method as recited in claim 62 wherein a status message is received from said license server in response to said request, said status message providing information about whether said requested license has been granted or not, wherein a description of said status message is output in said diagnosis description, and wherein when said requested license has not been granted, said diagnosis description includes a license policy reason why said license was not granted.

65. A method as recited in claim 62 wherein when said license server has not been located in step (b), connection diagnostics are implemented to attempt connections at a plurality of network addresses to locate said license server.

66. A method as recited in claim 65 wherein said connection diagnostics attempt to locate said license server at a plurality of sequential network addresses, wherein after an attempt at a network address, a description of the result of said attempt is included in said diagnosis description.

67. A method for providing a license server location on a network implementing a license management system, said location being provided to a client computer system, the method comprising the steps of:

receiving a request from a client computer system for a license address of a license server on said network, said client computer system requiring said license address to locate said license server and thereby request a license from said license server for a designated program in use on said client computer system;

looking up a license address for said license server in a table, wherein said license address is determined by client information in said request; and providing said license address to said client computer system.

68. A method as recited in claim 67 wherein said client information includes parameters of at least one of a name of a user on said client computer system, a host name of said client computer system, a terminal name of said client computer system, a vendor name of said designated program, and a name of said designated program, and wherein at least one of said parameters in said client information is included in said table.

69. A method as recited in claim 68, wherein a plurality of client computer systems connected to said license management system can request a license address for a license server, wherein each of said client computer systems provides a request with said parameters, wherein at least one of said parameters is included in said table.

70. A method as recited in claim 67 wherein said step of looking up a license address includes looking up a single license address in said table that is provided to all client computer systems.

* * * * *

UNITED STATES PATENT AND TRADEMARK OFFICE

CERTIFICATE OF CORRECTION

PATENT NO. : 5,671,412

DATED : September 23, 1997

INVENTOR(S) : Christiano

It is certified that error appears in the above-indentified patent and that said Letters Patent is hereby corrected as shown below:

Column 5, line 33, change "FIG. 2" to --FIG. 2a--.
Column 16, line 2, after "license" change ",," to --,--.
Column 21, line 47, change "fight" to --right--.
Column 24, line 44, delete "," after "computer".
Column 28, line 4, delete ";" after "license".
Column 28, line 22, change "mount" to --amount--.
Column 31, line 33, change "mount" to --amount--.

Signed and Sealed this

Twentieth Day of January, 1998

Attest:

BRUCE LEHMAN

*Attesting Officer* *Commissioner of Patents and Trademarks*